US009232125B2

(12) United States Patent
Song

(10) Patent No.: US 9,232,125 B2
(45) Date of Patent: Jan. 5, 2016

(54) METHOD OF ELIMINATING A SHUTTER-LAG, CAMERA MODULE, AND MOBILE DEVICE HAVING THE SAME

(75) Inventor: Yong-Bae Song, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 339 days.

(21) Appl. No.: 13/600,045

(22) Filed: Aug. 30, 2012

(65) Prior Publication Data

US 2013/0135499 A1  May 30, 2013

(30) Foreign Application Priority Data

Nov. 28, 2011  (KR) .......................... 10-2011-0124906

(51) Int. Cl.
*H04N 5/232* (2006.01)
*H04N 5/341* (2011.01)

(52) U.S. Cl.
CPC ........... *H04N 5/232* (2013.01); *H04N 5/23245* (2013.01); *H04N 5/341* (2013.01)

(58) Field of Classification Search
CPC .......................... H04N 5/23245; H04N 5/341
USPC ................. 348/222.1, 143, 154–155
See application file for complete search history.

(56) References Cited

U.S. PATENT DOCUMENTS

| 2003/0189647 A1* | 10/2003 | Kang ........................ 348/207.99 |
| 2004/0212678 A1* | 10/2004 | Cooper et al. ................. 348/155 |
| 2005/0157198 A1 | 7/2005 | Larner et al. |
| 2009/0049220 A1* | 2/2009 | Conti et al. .................... 710/267 |
| 2010/0177204 A1* | 7/2010 | Tsuchiya ................... 348/222.1 |
| 2011/0122269 A1 | 5/2011 | Zhao et al. |
| 2012/0172086 A1* | 7/2012 | Choi et al. ................. 455/556.1 |
| 2013/0021489 A1* | 1/2013 | Sewell et al. .............. 348/222.1 |

FOREIGN PATENT DOCUMENTS

| JP | 4018695 A | 1/1992 |
| KR | 0602705 | 7/2006 |
| KR | 0650871 | 11/2006 |

* cited by examiner

*Primary Examiner* — Mekonnen Dagnew
(74) *Attorney, Agent, or Firm* — Harness, Dickey & Pierce, P.L.C.

(57) ABSTRACT

A method of reducing shutter-lag in a camera image sensor may include maintaining a sensor output image to have a low resolution in a preview mode of a camera image sensor; changing a resolution of the sensor output image from a low resolution to a high resolution in response to a capture preparation signal to change an operation mode of the camera image sensor from a preview mode to a capture preparation mode, the low resolution being a resolution equal to or below a reference resolution, the high resolution being a resolution above the reference resolution; and capturing the sensor output image in response to a capture signal in the capture preparation mode of the camera image sensor.

39 Claims, 14 Drawing Sheets

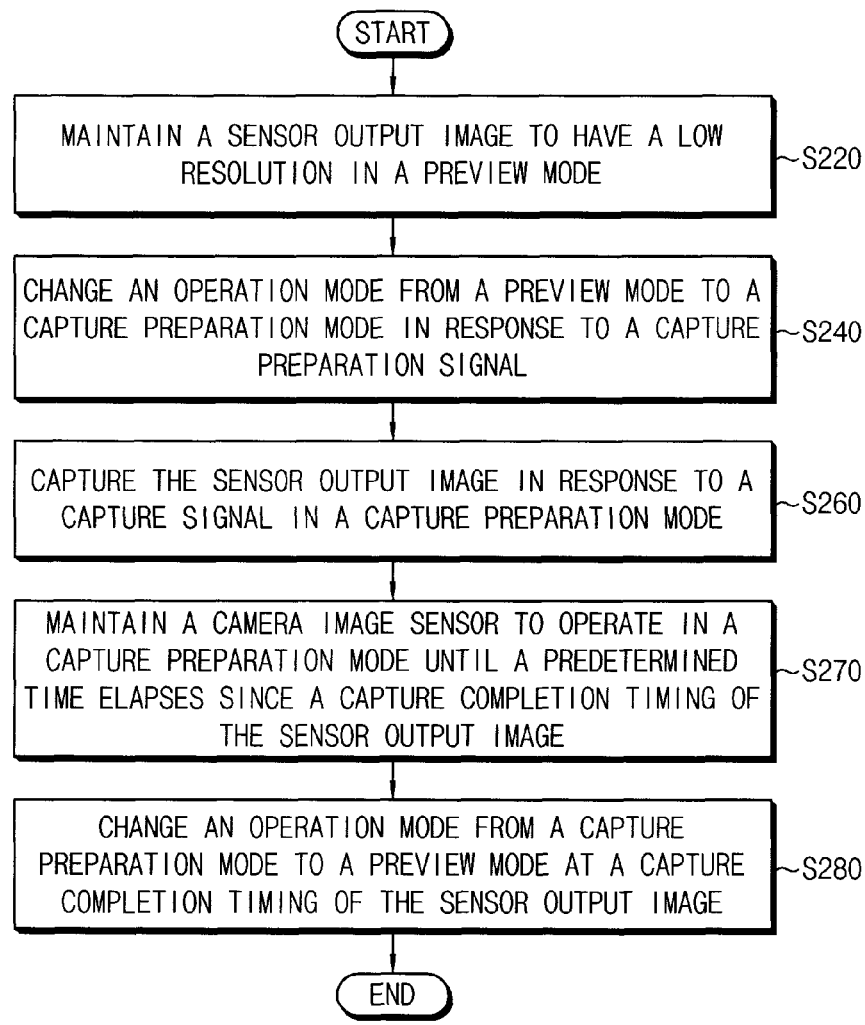
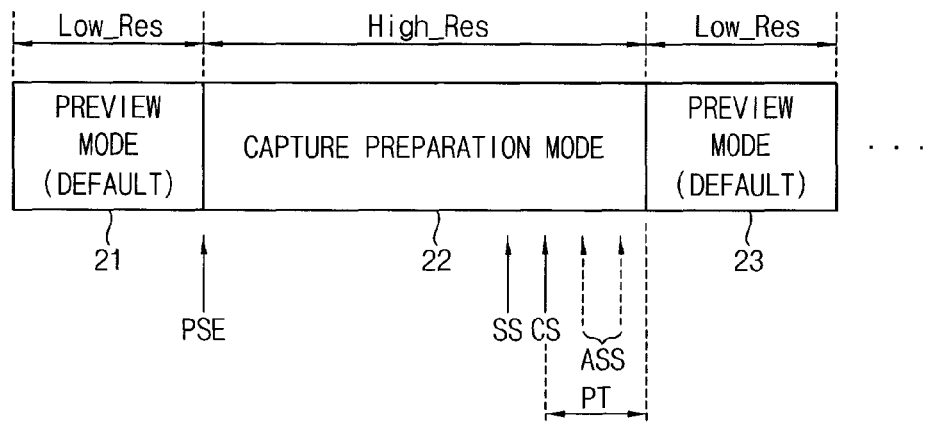

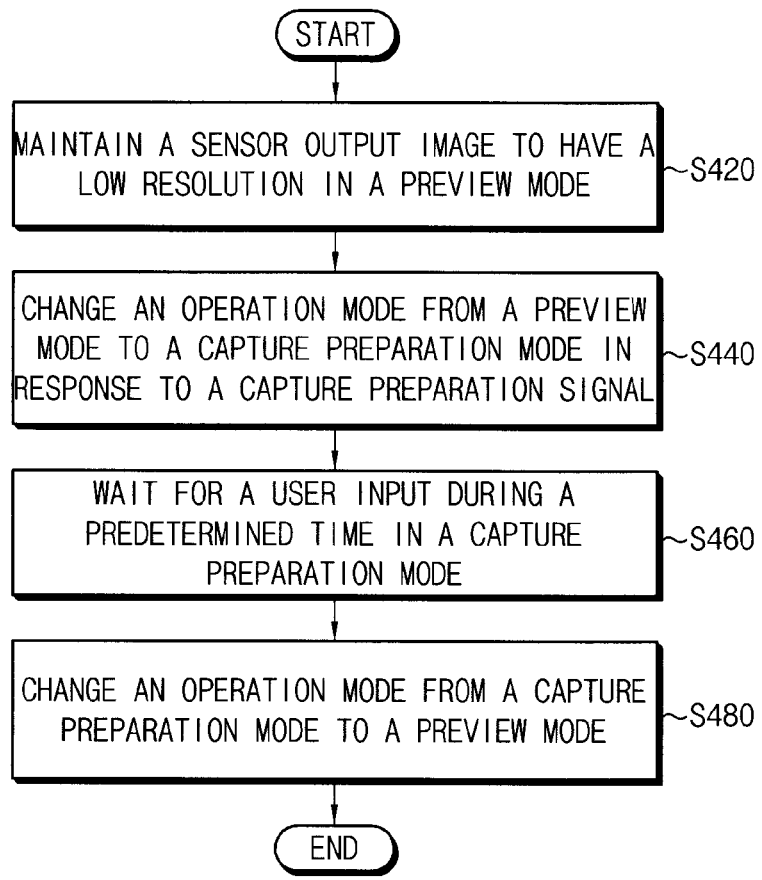
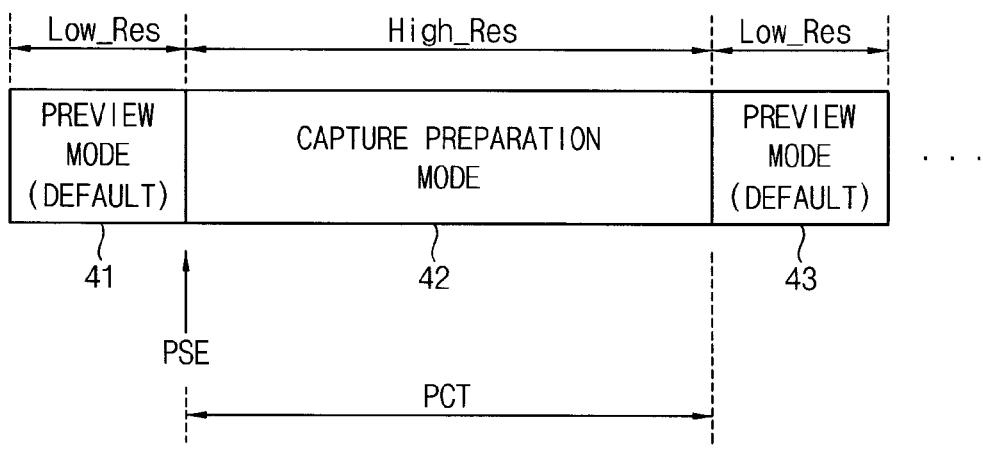

METHOD OF ELIMINATING A SHUTTER-LAG, CAMERA MODULE, AND MOBILE DEVICE HAVING THE SAME

CROSS-REFERENCE TO RELATED APPLICATION(S)

This application claims priority under 35 USC §119 to Korean Patent Application No. 10-2011-0124906, filed on Nov. 28, 2011 in the Korean Intellectual Property Office (KIPO), the entire contents of which are incorporated herein by reference.

BACKGROUND

1. Technical Field

Example embodiments relate generally to an electric device (e.g., a mobile device). More particularly, example embodiments of the inventive concepts relate to a mobile device having a camera module.

2. Description of the Related Art

A mobile device may include a camera module according to a mobile convergence tendency. Generally, a shutter-lag may indicate a delay between a timing at which a user presses (e.g., triggers) a shutter and a timing at which an image is actually captured. Hence, a shutter-lag may be an important evaluation factor for evaluating a performance of a camera module. For example, with respect to a camera module having a long shutter-lag, a user may not accurately obtain an image of the moment that the user wants.

In order to decrease a shutter-lag, a conventional camera module may maintain a sensor output image to have a user setting capture size even in a preview mode. In this case, since the sensor output image has a high resolution in a preview mode, the conventional camera module may consume unnecessary power thereby. Accordingly, a trade-off relation may exist between a length of shutter-lag and an amount of unnecessary power consumption in the conventional camera module.

SUMMARY

Some example embodiments provide a method of eliminating a shutter-lag capable of maintaining a sensor output image to have a low resolution in a preview mode of a camera image sensor (CIS), and capable of preventing a shutter-lag from being caused when an image is captured in a capture preparation mode of the camera image sensor.

Some example embodiments provide a camera module capable of maintaining a sensor output image to have a low resolution in a preview mode of a camera image sensor, and capable of preventing a shutter-lag from being caused when an image is captured in a capture preparation mode of the camera image sensor.

Some example embodiments provide a mobile device having the camera module.

According to example embodiments of the inventive concepts, a method of reducing shutter-lag in a camera image sensor may include maintaining a sensor output image to have a low resolution in a preview mode of a camera image sensor; changing a resolution of the sensor output image from a low resolution to a high resolution in response to a capture preparation signal to change an operation mode of the camera image sensor from a preview mode to a capture preparation mode, the low resolution being a resolution equal to or below a reference resolution, the high resolution being a resolution above the reference resolution; and capturing the sensor output image in response to a capture signal in the capture preparation mode of the camera image sensor.

In example embodiments, the method may further include a step of changing a resolution of the sensor output image from a high resolution to a low resolution to change an operation mode of the camera image sensor from a capture preparation mode to a preview mode when the sensor output image is captured in a capture preparation mode.

In example embodiments, the method may further include a step of changing a resolution of the sensor output image from a high resolution to a low resolution to change an operation mode of the camera image sensor from a capture preparation mode to a preview mode when a predetermined time elapses in a capture preparation mode.

In example embodiments, the method may further include a step of changing a resolution of the sensor output image from a high resolution to a low resolution to change an operation mode of the camera image sensor from a capture preparation mode to a preview mode when a mode change signal is input in a capture preparation mode.

In example embodiments, a resolution of the sensor output image may be changed from a low resolution to a high resolution when the capture preparation signal is input in a preview mode of the camera image sensor.

In example embodiments, a resolution of the sensor output image may be changed from a low resolution to a high resolution when a predetermined time elapses after the capture preparation signal is input in a preview mode of the camera image sensor.

In example embodiments, the capture preparation signal may correspond to an auto-focus start signal for performing a focusing operation.

In example embodiments, the capture preparation signal may correspond to an external input signal for performing a focusing operation.

In example embodiments, the capture preparation signal may correspond to at least one signal that is selected among a touch input signal, a button input signal, and a sound input signal.

In example embodiments, the capture preparation signal may correspond to a smile detection signal for performing a smile detecting operation.

In example embodiments, the capture preparation signal may correspond to a face detection signal for performing a face detecting operation.

In example embodiments, a size of the sensor output image having a low resolution may correspond to a display output size, and a size of the sensor output image having a low resolution may be changed as the display output size is changed.

In example embodiments, a size of the sensor output image having a high resolution may correspond to a predetermined size, and the predetermined size may be changed by a user.

According to example embodiments of the inventive concepts, a camera module may include an image sensor unit that generates a sensor output image by performing a photoelectric transformation; a mode control unit that maintains the sensor output image to have a low resolution in a preview mode of the camera module, that changes a resolution of the sensor output image from the low resolution to a high resolution in response to a capture preparation signal, and that maintains the sensor output image to have the high resolution in a capture preparation mode of the camera module, the low resolution being a resolution equal to or below a reference resolution, the high resolution being a resolution above the reference resolution; and an image signal processing unit that processes the sensor output image to generate image data.

In example embodiments, the camera module may be implemented by a system on chip (SOC).

In example embodiments, the mode control unit may set the sensor output image to have a low resolution in a preview mode of the camera module, and the mode control unit may set the sensor output image to have a high resolution in a capture preparation mode of the camera module.

In example embodiments, the mode control unit may change an operation mode of the camera module from a capture preparation mode to a preview mode when the sensor output image is captured in a capture preparation mode of the camera module.

In example embodiments, the mode control unit may change an operation mode of the camera module from a capture preparation mode to a preview mode when a predetermined time elapses in a capture preparation mode of the camera module.

In example embodiments, the mode control unit may change an operation mode of the camera module from a capture preparation mode to a preview mode when a mode change signal is input in a capture preparation mode of the camera module.

In example embodiments, the capture preparation signal may correspond to an auto-focus start signal for performing a focusing operation.

In example embodiments, the capture preparation signal may correspond to an external input signal for performing a focusing operation.

In example embodiments, the capture preparation signal may correspond to a smile detection signal for performing a smile detecting operation.

In example embodiments, the capture preparation signal may correspond to a face detection signal for performing a face detecting operation.

According to example embodiments of the inventive concepts, a mobile device may include a camera image sensor that generates a sensor output image, an application processor that processes the sensor output image, and at least one display device that generates a display based on the sensor output image. Here, the application processor may include a mode controller that maintains the sensor output image to have a low resolution in a preview mode of the camera image sensor, that changes a resolution of the sensor output image from the low resolution to a high resolution in response to a capture preparation signal, and that maintains the sensor output image to have a high resolution in a capture preparation mode of the camera image sensor, an image signal processor that processes the sensor output image to generate first image data, a post-processor that post-processes the first image data to generate second image data, and a display controller that provides the second image data, the display being generated based on the second image data.

In example embodiments, the application processor may further include a memory device that temporarily stores the first image data to output the first image data to the post-processor.

In example embodiments, the mode controller may include a real-time operation system (RTOS).

In example embodiments, the mobile device may correspond to a cellular phone, a smart phone, a digital camera, a tablet, or camcorder.

In example embodiments, the application processor may be coupled to an external display device through at least one input/output (I/O) terminal, and the application processor may output the image data to the external display device.

In example embodiments, the application processor may communicate with the camera image sensor based on MIPI, ITU-R BT.601, ITU-R BT.656, or ITU-R BT.709.

In example embodiments, the capture preparation signal may correspond to an auto-focus start signal for performing a focusing operation.

In example embodiments, the capture preparation signal may correspond to an external input signal for performing a focusing operation.

In example embodiments, the capture preparation signal may correspond to a smile detection signal for performing a smile detecting operation.

In example embodiments, the capture preparation signal may correspond to a face detection signal for performing a face detecting operation.

According to example embodiments of the inventive concepts, a method of operating an image sensor of a camera module may include outputting a preview image from the image sensor using a first resolution as an image output resolution of the image sensor; changing the image output resolution of the image sensor from the first resolution to second resolution in response to a capture preparation signal received at the camera module, the second resolution being higher than the first resolution; and capturing a selected image using the second resolution as the image output resolution of the image sensor, the selected image being captured in response to a capture signal received at the camera module, the capture preparation signal being received at the camera module before the capture signal.

Therefore, a method of eliminating a shutter-lag according to example embodiments of the inventive concepts may prevent unnecessary power consumption in a preview mode of a camera image sensor, and may prevent a shutter-lag from being caused when an image is captured in a capture preparation mode of the camera image sensor by maintaining a sensor output image to have a low resolution in a preview mode of the camera image sensor, by changing a resolution of the sensor output image from a low resolution to a high resolution in response to a capture preparation signal, and by maintaining the sensor output image to have a high resolution in a capture preparation mode of the camera image sensor.

In addition, a camera module and a mobile device having the camera module according to example embodiments may prevent unnecessary power consumption in a preview mode of a camera image sensor, and may prevent a shutter-lag from being caused when an image is captured in a capture preparation mode of the camera image sensor by maintaining a sensor output image to have a low resolution in a preview mode of the camera image sensor, by changing a resolution of the sensor output image from a low resolution to a high resolution in response to a capture preparation signal, and by maintaining the sensor output image to have a high resolution in a capture preparation mode of the camera image sensor.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 3 is a flow chart illustrating a method of eliminating a shutter-lag according to example embodiments.

FIG. 4 is a diagram illustrating an operation that is performed by a method of FIG. 3.

FIG. 7 is a flow chart illustrating a method of eliminating a shutter-lag according to example embodiments.

FIG. 8 is a diagram illustrating an operation that is performed by a method of FIG. 7.

DETAILED DESCRIPTION OF THE EMBODIMENTS

Figure 1:
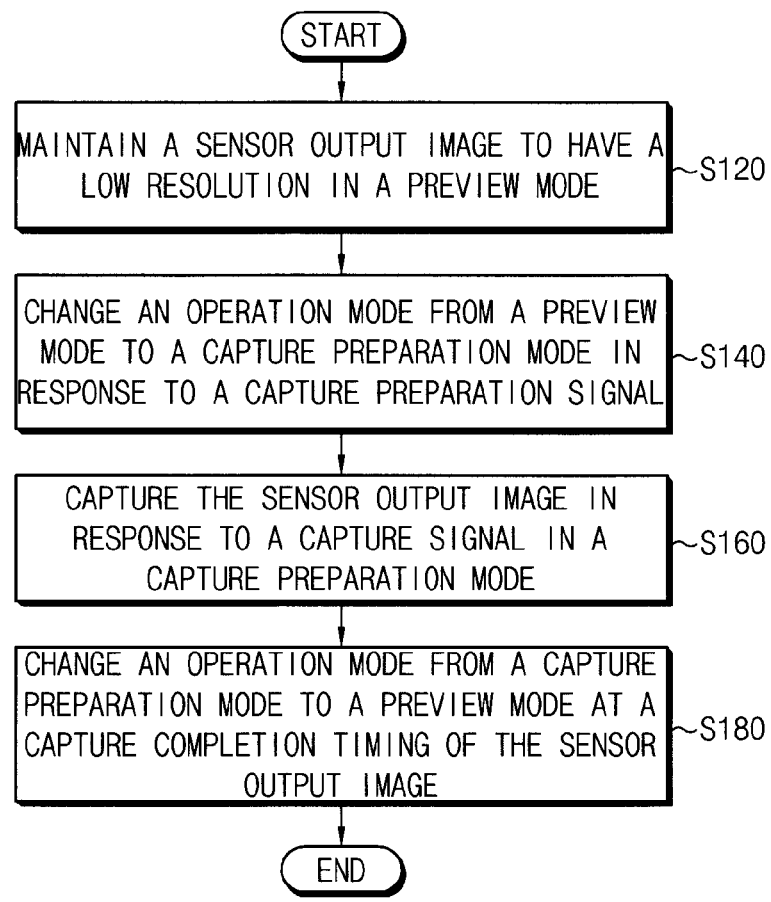
FIG. 1 is a flow chart illustrating a method of eliminating a shutter-lag according to example embodiments.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a flow chart illustrating a method of eliminating a shutter-lag according to example embodiments.

Referring to FIG. 1, the method illustrated in FIG. 1 may include maintaining a sensor output image to have a low resolution in a preview mode of a camera image sensor in step S120, changing an operation mode of the camera image sensor from a preview mode to a capture preparation mode by changing a resolution of the sensor output image from a low resolution to a high resolution in response to a capture preparation signal in step S140, and capturing the sensor output image in response to a capture signal in a capture preparation mode of the camera image sensor in step S160 In addition, the method of FIG. 1 may include changing an operation mode of the camera image sensor from a capture preparation mode to a preview mode by changing a resolution of the sensor output image from a high resolution to a low resolution at a capture completion timing of the sensor output image in step S180.

Generally, when a user selects a camera function of a mobile device having a camera module, a camera image sensor of the camera module may enter into a preview mode. Here, a user watches a preview image in a preview mode in real-time. Thus, a user may determine a subject for photography while watching the preview image in a preview mode. For example, a preview mode may provide convenience to a user. However, when the camera image sensor operates in a preview mode, the camera image sensor may consume unnecessary power if the sensor output image output from the camera image sensor is set to have a high resolution (i.e., referred to as a full-frame preview). Thus, a conventional method by which a sensor output image is set to have a low resolution in a preview mode of the camera image sensor, and the sensor output image is changed to have a high resolution in response to a capture signal generated when a user triggers a shutter release operation has been used. For example, a user may trigger a shutter release operation to cause the shutter to open and close in accordance with an image capturing operation by pressing a shutter release button, or performing some other activation operation. For the purpose of clarity, the operation of initiating a shutter release operation will be referred to hereafter as triggering a shutter or pressing a shutter release button. However, example embodiments of the inventive concepts are not limited to methods of to initiating a shutter release operation which include pressing a button, and may be applied to any method for a user to initiate a shutter release operation.

Since an operation for changing a resolution of the sensor output image for example, from a low resolution to a high resolution, results in a delay, a timing at which a user presses a shutter release button may be different from a timing at which an image is actually captured. Thus, a delay between a timing at which a user presses a shutter release button and a timing at which an image is actually captured (i.e., a shutter-lag) is caused by the conventional method. As a result, a user may not accurately obtain an image of the moment that the user wants. For instance, since a shutter-lag of a camera module in a cellular phone may be, for example, 0.1~0.3 seconds, a user may obtain an image of the moment that is delayed by 0.1~0.3 seconds from a timing at which a user presses a shutter release button.

To overcome problems above, the method of FIG. 1 may include maintaining the sensor output image to have a low resolution in a preview mode of the camera image sensor as is described with reference to step S120. If the sensor output image has a high resolution in a preview mode of the camera image sensor in order to prevent a shutter-lag from being caused, unnecessary power may be consumed thereby. Thus, the sensor output image may be maintained to have a low resolution in a preview mode of the camera image sensor. In some example embodiments, the method of FIG. 1 may use a sub-sampling function to maintain the sensor output image to have a low resolution in a preview mode of the camera image sensor. Here, it should be understood that a "resolution" of the sensor output image is a term which may include a "pixel" of the sensor output image, a "size" of the sensor output image, a "capacity" of the sensor output image, a "sampling rate" of the sensor output image, etc. According to example embodiments of the inventive concepts, a size of the sensor output image having a low resolution may correspond to a display output size. For example, a size of the sensor output image having a low resolution may be a VGA (640*480 pixels) size. Accordingly, as used herein, a low resolution may be any resolution equal to or below a reference resolution, for example VGA (640*480), and a high resolution may be any resolution above the reference resolution. In addition, as a display output size is changed, a size of the sensor output image having a low resolution may be changed. For example, when a camera module employing the method of FIG. 1 is coupled to an external display device, and an image data is output on the external display device, a size of the sensor output image having a low resolution may be changed to be a display output size of the external display device.

As is described above with reference to step S140, the method of FIG. 1 may include changing an operation mode of the camera image sensor from a preview mode to a capture preparation mode by changing a resolution of the sensor output image from a low resolution to a high resolution in response to the capture preparation signal when the capture preparation signal is input in a preview mode of the camera image sensor. For example, the method of FIG. 1 does not include changing a resolution of the sensor output image for example, from a low resolution to a high resolution, when a shutter is pressed or otherwise triggered in a capture preparation mode of the camera image sensor. Rather, the method of FIG. 1 changes a resolution of the sensor output image, for example, from a low resolution to a high resolution, when an operation mode of the sensor output image is changed from a preview mode to a capture preparation mode. As a result, the sensor output image may already have a high resolution before a capture signal is input, for example, before a user presses a shutter release button. Thus, an operation for changing a resolution of the sensor output image, for example, from a low resolution to a high resolution, may not be required after a user presses a shutter release button. Therefore, a shutter-lag corresponding to a delay between a timing at which a user presses a shutter release button and a timing at which an image is actually captured may not be caused. According to example embodiments of the inventive concepts, a size of the sensor output image having a high resolution may correspond to a predetermined or reference size. In addition, the predetermined or reference size may be changed by a user. For example, a size of the sensor output image having a high resolution may be a full-frame size, for example 5 Mpixel (2608*1960 pixels), 8 Mpixel (3264*2448 pixels), etc. As described above, a camera module employing the method of FIG. 1 may operate in a preview mode for a user to watch a preview image in real-time, or may operate in a capture preparation mode for a user to capture an image. Meanwhile, a preview mode may be substantially referred to as a low resolution preview mode, and a capture preparation mode may be substantially referred to as a high resolution preview mode.

According to example embodiments of the inventive concepts, the capture preparation signal may be an auto-focus start signal for performing a focusing operation. For example, when a user selects an auto-focusing function on a camera function setting menu, a timing at which a resolution of the sensor output image is changed from a low resolution to a high resolution may correspond to a timing at which the auto-focus start signal is input. According to example embodiments of the inventive concepts, the capture preparation signal may be an external input signal for performing a focusing operation. Here, the external input signal may be at least one signal that is selected among a touch input signal, a button input signal, and a sound input signal. For example, when a user touches a subject for photography on a display device, presses a camera focus button, or makes a sound for performing a focusing operation, a timing at which a resolution of the sensor output image is changed from a low resolution to a high resolution may correspond to a timing at which the external input signal is input.

According to example embodiments of the inventive concepts, the capture preparation signal may be a smile detection signal for performing a smile detecting operation. For example, when a user selects a smile detecting function on a camera function setting menu, a timing at which a resolution of the sensor output image is changed from a low resolution to a high resolution may correspond to a timing at which the smile detection signal is generated when a smile on a face of a subject (e.g., a person) is detected. According to example embodiments of the inventive concepts, the capture preparation signal may be a face detection signal for performing a face detecting operation. For example, when a user selects a face detecting function on a camera function setting menu, a timing at which a resolution of the sensor output image is changed from a low resolution to a high resolution may correspond to a timing at which the face detection signal is generated when a face of a subject (e.g., a person) is detected. In some example embodiments, the capture preparation signal may be selected among various signals that are generated for the camera module before a shutter is pressed by a user.

As described above, a resolution of the sensor output image may be changed from a low resolution to a high resolution in response to the capture preparation signal. According to example embodiments of the inventive concepts, a resolution of the sensor output image may be changed from a low resolution to a high resolution as soon as the capture preparation signal is input in a preview mode of the camera image sensor. According to example embodiments of the inventive concepts, a resolution of the sensor output image may be changed from a low resolution to a high resolution when a predetermined or reference time elapses after the capture preparation signal is input in a preview mode of the camera image sensor. Since an operation mode of the camera image sensor is changed from a preview mode to a capture preparation mode when a resolution of the sensor output image is changed from a low resolution to a high resolution, it may be desirable for a resolution of the sensor output image to be changed from a low resolution to a high resolution as soon as the capture preparation signal is input in a preview mode of the camera image sensor. However, if a resolution of the sensor output image is changed from a low resolution to a high resolution as soon as the capture preparation signal is input in a preview mode of the camera image sensor, a noise may be caused in an image that is displayed on a display device. In this case, in order to align a clock edge and the like, a resolution of the sensor output image may be changed from a low resolution to a high resolution when a predetermined or reference time elapses after the capture preparation signal is input in a preview mode of the camera image sensor.

As is described above with reference to step S160, the method of FIG. 1 may include capturing the sensor output image in response to the capture signal in a capture preparation mode of the camera image sensor, the capture signal being generated when a user triggers a shutter. As described above, since the sensor output image already has a high resolution in a capture preparation mode of the camera image sensor, an operation for changing a resolution of the sensor output image, for example, from a low resolution to a high resolution, may not be required after the capture signal is input in a capture preparation mode of the camera image sensor, for example after a user triggers a shutter. Therefore, a shutter-lag corresponding to a delay between a timing at which a user presses a shutter release button and a timing at which an image is actually captured may not be caused. In addition, since the capture preparation signal may be a signal related to, for example, one or more of i) a focusing operation, for example the auto-focus start signal, ii) the external input signal, for example the touch input signal, the button input signal, the sound input signal, etc, iii) the smile detection signal, and iv) the face detection signal, a focusing operation may also be performed in a capture preparation mode of the camera image sensor. Thus, a user may not recognize a delay due to a focusing operation that is substantially the largest delay caused in the camera module. In some example embodiments, the method of FIG. 1 may acoustically or visually inform a user of the completion of a focusing operation.

Next, as is described above with reference to step S180, the method of FIG. 1 may include changing an operation mode of the camera image sensor from a capture preparation mode to a preview mode by changing a resolution of the sensor output image from a high resolution to a low resolution at a capture completion timing of the sensor output image. Further, according to example embodiments of the inventive concepts, the method of FIG. 1 may include repeating steps S120, S140, S160, and S180 continuously to capture new images. As described above, the method of FIG. 1 may prevent unnecessary power consumption in a preview mode of the camera image sensor, and may prevent a shutter-lag from being caused when an image is captured in a capture preparation mode of the camera image sensor by maintaining the sensor output image to have a low resolution in a preview mode of the camera image sensor, by changing a resolution of the sensor output image from a low resolution to a high resolution in response to the capture preparation signal, and by maintaining the sensor output image to have a high resolution in a capture preparation mode of the camera image sensor.

Figure 2:
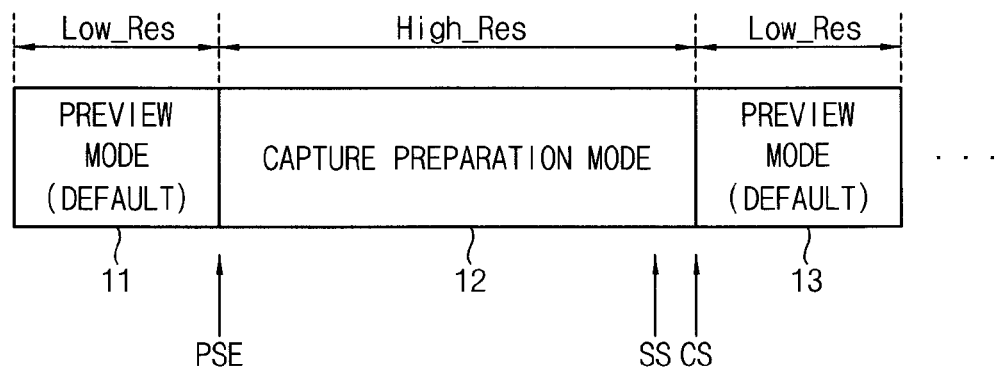
FIG. 2 is a diagram illustrating an operation that is performed by a method of FIG. 1.

FIG. 2 is a diagram illustrating an operation that is performed by a method of FIG. 1.

Referring to FIG. 2, by the method of FIG. 1, an operation mode of the camera image sensor may be changed between a preview mode 11 and 13 and a capture preparation mode 12. In a preview mode 11 and 13 of the camera image sensor, the sensor output image may be maintained to have a low resolution. In a capture preparation mode 12 of the camera image sensor, the sensor output image may be maintained to have a high resolution. Thus, a preview mode 11 and 13 of the camera image sensor may be substantially referred to as a low resolution preview mode, and a capture preparation mode 12 of the camera image sensor may be substantially referred to as a high resolution preview mode. As illustrated in FIG. 2, when a capture preparation signal PSE is input in a preview mode 11 of the camera image sensor, the method of FIG. 1 may change a resolution of the sensor output image from a low resolution to a high resolution in response to the capture preparation signal PSE to change an operation mode of the camera image sensor from a preview mode 11 to a capture preparation mode 12. Here, the capture preparation signal PSE may include, for example, one or more of an auto-focus start signal, an external input signal, a smile detection signal, and a face detection signal. Examples of external input signals include a touch input signal, a button input signal, a sound input signal, etc.

Generally, a capture signal SS may be generated when a user presses a shutter release button. Thus, when the capture signal SS is input in a capture preparation mode 12 of the camera image sensor, the method of FIG. 1 may capture the sensor output image in response to the capture signal SS. Here, since the sensor output image already has a high resolution in a capture preparation mode 12 of the camera image sensor, an operation for changing a resolution of the sensor output image, for example, from a low resolution to a high resolution, may not be required after the capture signal SS is input in a capture preparation mode 12 of the camera image sensor. Therefore, a shutter-lag corresponding to a delay between a timing at which a user presses a shutter release button and a timing at which an image is actually captured may not be caused. In addition, when the sensor output image is captured in a capture preparation mode 12 of the camera image sensor, the method of FIG. 1 may change a resolution of the sensor output image from a high resolution to a low resolution at a capture completion timing CS of the sensor output image. As a result, an operation mode of the camera image sensor may be changed from a capture preparation mode 12 to a preview mode 13. For example, the sensor output image may be maintained to have a low resolution until a capture preparation signal PSE for capturing new images is input in a preview mode 13 of the camera image sensor. As described above, the method of FIG. 1 may prevent unnecessary power consumption in a preview mode 11 and 13 of the camera image sensor, and may prevent a shutter-lag from being caused when an image is captured in a capture preparation mode 12 of the camera image sensor.

FIG. 3 is a flow chart illustrating a method of eliminating a shutter-lag according to example embodiments.

Referring to FIG. 3, the method of FIG. 3 may include maintaining a sensor output image to have a low resolution in a preview mode of a camera image sensor in step S220, changing an operation mode of the camera image sensor from a preview mode to a capture preparation mode by changing a resolution of the sensor output image from a low resolution to a high resolution in response to a capture preparation signal in step S240, and capturing the sensor output image in response to a capture signal in a capture preparation mode of the camera image sensor in step S260. Steps S220, S240 and S260 may be the same as steps S120, S140 and S160 described above with reference to FIG. 1. Accordingly, descriptions thereof will be omitted below.

In step S270, after the sensor output image is captured in a capture preparation mode of the camera image sensor, the method of FIG. 3 may maintain the camera image sensor to operate in a capture preparation mode until a predetermined or reference time elapses since a capture completion timing of the sensor output image. Then, in step S280, an operation mode of the camera image sensor may be changed from a capture preparation mode to a preview mode by changing a resolution of the sensor output image from a high resolution to a low resolution when the predetermined or reference time elapses since the capture completion timing of the sensor output image. Generally, a delay due to a focusing operation may be substantially the largest delay caused in the camera module. In addition, the camera module may provide a function for capturing a plurality of images at once for user needs. Thus, the method of FIG. 3 may enable the camera module to continuously capture a plurality of images for which a focusing operation has been completed because the method of FIG. 3 maintains the camera image sensor to operate in a capture preparation mode until the predetermined or reference time elapses since the capture completion timing of the sensor output image. As a result, the method of FIG. 3 may reduce the number of operation mode changes between a preview mode and a capture preparation mode. As described above, the method of FIG. 3 may prevent unnecessary power consumption in a preview mode of the camera image sensor, and may prevent a shutter-lag from being caused when an image is captured in a capture preparation mode of the camera image sensor by maintaining the sensor output image to have a low resolution in a preview mode of the camera image sensor, by changing a resolution of the sensor output image from a low resolution to a high resolution in response to the capture preparation signal, and by maintaining the sensor output image to have a high resolution in a capture preparation mode of the camera image sensor.

FIG. 4 is a diagram illustrating an operation that is performed by a method of FIG. 3.

Referring to FIG. 4, by the method of FIG. 3, an operation mode of the camera image sensor may be changed between a preview mode 21 and 23 and a capture preparation mode 22. In a preview mode 21 and 23 of the camera image sensor, the sensor output image may be maintained to have a low resolution. In a capture preparation mode 22 of the camera image sensor, the sensor output image may be maintained to have a high resolution. Thus, a preview mode 21 and 23 of the camera image sensor may be substantially referred to as a low resolution preview mode, and a capture preparation mode 22 of the camera image sensor may be substantially referred to as a high resolution preview mode. As illustrated in FIG. 4, when a capture preparation signal PSE is input in a preview mode 21 of the camera image sensor, the method of FIG. 3 may change a resolution of the sensor output image from a low resolution to a high resolution in response to the capture preparation signal PSE to change an operation mode of the camera image sensor from a preview mode 21 to a capture preparation mode 22. Here, the capture preparation signal PSE may include an auto-focus start signal, an external input signal (e.g., a touch input signal, a button input signal, a sound input signal, etc), a smile detection signal, and a face detection signal.

Generally, a capture signal SS may be generated when a user presses a shutter release button. Thus, when the capture signal SS is input in a capture preparation mode 22 of the camera image sensor, the method of FIG. 3 may capture the sensor output image in response to the capture signal SS. Here, since the sensor output image already has a high resolution in a capture preparation mode 22 of the camera image sensor, an operation for changing a resolution of the sensor output image, for example, from a low resolution to a high resolution, may not be required after the capture signal SS is input in a capture preparation mode 22 of the camera image sensor. Therefore, a shutter-lag corresponding to a delay between a timing at which a user presses a shutter release button and a timing at which an image is actually captured may not be caused. In addition, when the sensor output image is captured in a capture preparation mode 22 of the camera image sensor, the method of FIG. 3 may change a resolution of the sensor output image from a high resolution to a low resolution when a predetermined or reference time PT elapses since a capture completion timing CS of the sensor output image. As a result, an operation mode of the camera image sensor may be changed from a capture preparation mode 22 to a preview mode 23. For example, the method of FIG. 3 may enable the camera module to capture additional images ASS because the method of FIG. 3 maintains the camera image sensor to operate in a capture preparation mode 22 until the predetermined or reference time PT elapses since the capture completion timing CS of the sensor output image.

After the predetermined or reference time PT elapses since the capture completion timing CS of the sensor output image, an operation mode of the camera image sensor may be changed from a capture preparation mode 22 to a preview mode 23. Then, the sensor output image may be maintained to have a low resolution until a capture preparation signal PSE for capturing new images is input in a preview mode 23 of the camera image sensor. As described above, the method of FIG. 3 may prevent unnecessary power consumption in a preview mode 21 and 23 of the camera image sensor, and may prevent a shutter-lag from being caused when an image is captured in a capture preparation mode 22 of the camera image sensor. Further, the method of FIG. 3 may reduce the number of operation mode changes between a preview mode 21 and 23 and a capture preparation mode 22 by enabling the camera module to continuously capture a plurality of images for which a focusing operation has been completed.

Figure 5:
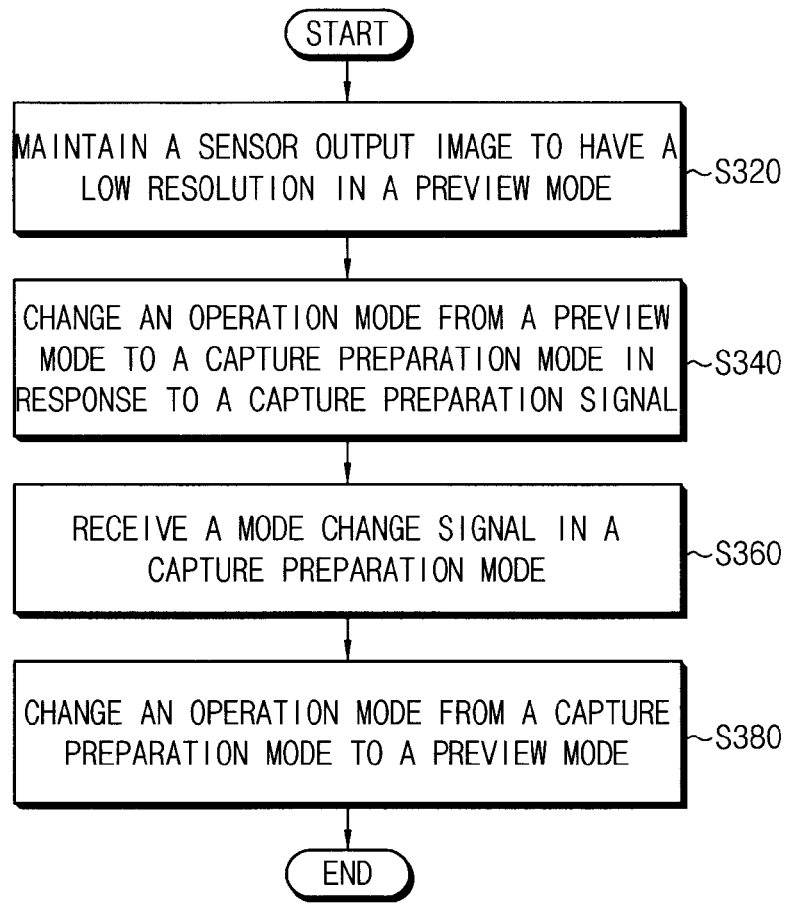
FIG. 5 is a flow chart illustrating a method of eliminating a shutter-lag according to example embodiments.

FIG. 5 is a flow chart illustrating a method of eliminating a shutter-lag according to example embodiments.

Referring to FIG. 5, the method of FIG. 5 may include maintaining a sensor output image to have a low resolution in a preview mode of a camera image sensor in step S320, and changing an operation mode of the camera image sensor from a preview mode to a capture preparation mode by changing a resolution of the sensor output image from a low resolution to a high resolution in response to a capture preparation signal in step S340. Steps S320 and S340 may be the same as steps S120 and S140 discussed above with reference to FIG. 1. Accordingly, descriptions thereof will be omitted below.

The method of FIG. 5 may include changing an operation mode of the camera image sensor from a capture preparation mode to a preview mode by changing a resolution of the sensor output image from a high resolution to a low resolution in step S380 when receiving a mode change signal in a capture preparation mode of the camera image sensor in step S360. The mode change signal may be received, for example, when a mode change signal is input. For example, when a user pushes a button to change an operation mode of the camera image sensor from a capture preparation mode to a preview mode, the mode change signal for changing an operation mode of the camera image sensor from a capture preparation mode to a preview mode may be generated. Then, a resolution of the sensor output image may be changed from a high resolution to a low resolution in response to the mode change signal, so that an operation mode of the camera image sensor may be changed from a capture preparation mode to a preview mode. After the camera image sensor enters into a capture preparation mode in response to a capture preparation signal, a user may intentionally change an operation mode of the camera image sensor from a capture preparation mode to a preview mode. For example, an operation mode of the camera image sensor may be changed from a capture preparation mode to a preview mode without any image capture by a user. Thus, the method of FIG. 5 may change an operation mode of the camera image sensor from a capture preparation mode to a preview mode in response to the mode change signal that is input by a user. As described above, the method of FIG. 5 may prevent unnecessary power consumption in a preview mode of the camera image sensor, and may prevent a shutter-lag from being caused when an image is captured in a capture preparation mode of the camera image sensor by maintaining the sensor output image to have a low resolution in a preview mode of the camera image sensor, by changing a resolution of the sensor output image from a low resolution to a high resolution in response to the capture preparation signal, and by maintaining the sensor output image to have a high resolution in a capture preparation mode of the camera image sensor. Further, the method of FIG. 5 may reduce power consumption of the camera module by allowing a user to directly end a capture preparation mode of the camera image sensor that consumes a relatively high power.

Figure 6:
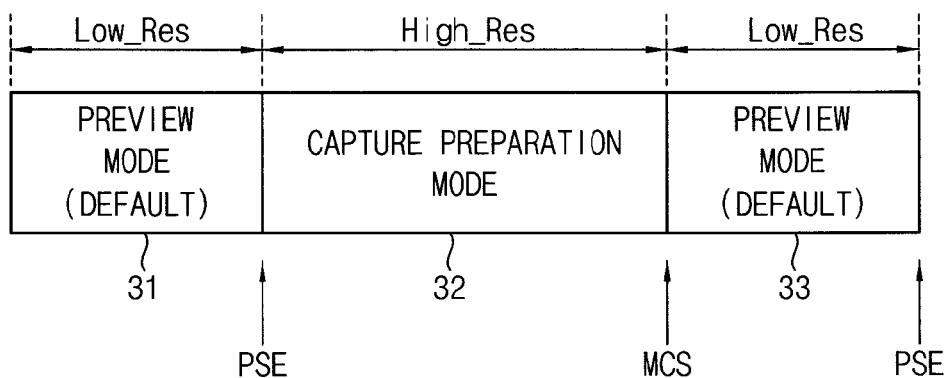
FIG. 6 is a diagram illustrating an operation that is performed by a method of FIG. 5.

FIG. 6 is a diagram illustrating an operation that is performed by a method of FIG. 5.

Referring to FIG. 6, by the method of FIG. 5, an operation mode of the camera image sensor may be changed between a preview mode 31 and 33 and a capture preparation mode 32. In a preview mode 31 and 33 of the camera image sensor, the sensor output image may be maintained to have a low resolution. In a capture preparation mode 32 of the camera image sensor, the sensor output image may be maintained to have a high resolution. Thus, a preview mode 31 and 33 of the camera image sensor may be substantially referred to as a low resolution preview mode, and a capture preparation mode 32 of the camera image sensor may be substantially referred to as a high resolution preview mode. As illustrated in FIG. 6, when a capture preparation signal PSE is input in a preview mode 31 of the camera image sensor, the method of FIG. 5 may change a resolution of the sensor output image from a low resolution to a high resolution in response to the capture preparation signal PSE to change an operation mode of the camera image sensor from a preview mode 31 to a capture preparation mode 32. Here, the capture preparation signal PSE may include an auto-focus start signal, an external input signal (e.g., a touch input signal, a button input signal, a sound input signal, etc), a smile detection signal, and a face detection signal.

When a mode change signal MCS is input in a capture preparation mode 32 of the camera image sensor, the method of FIG. 5 may change an operation mode of the camera image sensor from a capture preparation mode 32 to a preview mode 33 by changing a resolution of the sensor output image from a high resolution to a low resolution. For example, when a user pushes a button to change an operation mode of the camera image sensor from a capture preparation mode 32 to a preview mode 33, the mode change signal MCS for changing an operation mode of the camera image sensor from a capture preparation mode 32 to a preview mode 33 may be generated. For example, the method of FIG. 5 may allow a user to intentionally change an operation mode of the camera image sensor from a capture preparation mode 32 to a preview mode 33. As described above, the method of FIG. 5 may prevent unnecessary power consumption in a preview mode 31 and 33 of the camera image sensor, and may prevent a shutter-lag from being caused when an image is captured in a capture preparation mode 32 of the camera image sensor. Further, the method of FIG. 5 may reduce power consumption of the camera module by allowing a user to directly end a capture preparation mode 32 of the camera image sensor that consumes a relatively high power.

FIG. 7 is a flow chart illustrating a method of eliminating a shutter-lag according to example embodiments.

Referring to FIG. 7, the method of FIG. 7 may include maintaining a sensor output image to have a low resolution in a preview mode of a camera image sensor in step S420, and changing an operation mode of the camera image sensor from a preview mode to a capture preparation mode by changing a resolution of the sensor output image from a low resolution to a high resolution in response to a capture preparation signal in step S440. Steps S420 and S440 may be the same as steps S120 and S140 described above with reference to FIG. 1. Accordingly, descriptions thereof will be omitted below.

The method of FIG. 7 may include changing an operation mode of the camera image sensor from a capture preparation mode to a preview mode by changing a resolution of the sensor output image from a high resolution to a low resolution in step S480 after waiting for a user input, for example a behavior triggering a shutter, during a predetermined or reference time in a capture preparation mode of the camera image sensor in step S460. For example, the method of FIG. 7 may change an operation mode of the camera image sensor from a capture preparation mode to a preview mode when the predetermined or reference time elapses in a capture preparation mode of the camera image sensor. For example, when a user does not press a shutter release button during the predetermined or reference time in a capture preparation mode of the camera image sensor, an operation mode of the camera image sensor may be changed from a capture preparation mode to a preview mode. For example, a resolution of the sensor output image may be changed from a high resolution to a low resolution. For example, when a user does not press a shutter release button during the predetermined or reference time after an operation mode of the camera image sensor is changed from a preview mode to a capture preparation mode, it may be determined that a user intends not to press a shutter release button. Thus, the method of FIG. 7 may reduce power consumption by changing an operation mode of the camera image sensor from a capture preparation mode to a preview mode. Here, the predetermined or reference time may be variously set according to one or more conditions.

According to example embodiments of the inventive concepts, the predetermined or reference time may be calculated from an input timing of the capture preparation signal. According to example embodiments of the inventive concepts, the predetermined or reference time may be calculated from an input timing of a specific signal when the specific signal is input by a user. Examples of the specific signal include a signal associated with the shutter button being half-pressed. As described above, the method of FIG. 7 may prevent unnecessary power consumption in a preview mode of the camera image sensor, and may prevent a shutter-lag from being caused when an image is captured in a capture preparation mode of the camera image sensor by maintaining the sensor output image to have a low resolution in a preview mode of the camera image sensor, by changing a resolution of the sensor output image from a low resolution to a high resolution in response to the capture preparation signal, and by maintaining the sensor output image to have a high resolution in a capture preparation mode of the camera image sensor. Further, the method of FIG. 7 may reduce power consumption of the camera module by limiting a capture preparation mode of the camera image sensor to the predetermined or reference time, a capture preparation mode of the camera image sensor consuming a relatively high power.

FIG. 8 is a diagram illustrating an operation that is performed by a method of FIG. 7.

Referring to FIG. 8, by the method of FIG. 7, an operation mode of the camera image sensor may be changed between a preview mode 41 and 43 and a capture preparation mode 42. In a preview mode 41 and 43 of the camera image sensor, the sensor output image may be maintained to have a low resolution. In a capture preparation mode 42 of the camera image sensor, the sensor output image may be maintained to have a high resolution. Thus, a preview mode 41 and 43 of the camera image sensor may be substantially referred to as a low resolution preview mode, and a capture preparation mode 42 of the camera image sensor may be substantially referred to as a high resolution preview mode. As illustrated in FIG. 8, when a capture preparation signal PSE is input in a preview mode 41 of the camera image sensor, the method of FIG. 7 may change a resolution of the sensor output image from a low resolution to a high resolution in response to the capture preparation signal PSE to change an operation mode of the camera image sensor from a preview mode 41 to a capture preparation mode 42. Here, the capture preparation signal PSE may include an auto-focus start signal, an external input signal, a smile detection signal, and a face detection signal. Examples of the external input signal may include a touch input signal, a button input signal, a sound input signal, etc.

When a predetermined or reference time PCT elapses in a capture preparation mode 42 of the camera image sensor, the method of FIG. 7 may change an operation mode of the camera image sensor from a capture preparation mode 42 to a preview mode 43 by changing a resolution of the sensor output image from a high resolution to a low resolution. For example, when a user does not press a shutter release button during the predetermined or reference time PCT in a capture preparation mode 42 of the camera image sensor, an operation mode of the camera image sensor may be changed from a capture preparation mode 42 to a preview mode 43. For example, a resolution of the sensor output image may be changed from a high resolution to a low resolution. According to example embodiments of the inventive concepts, the predetermined or reference time PCT may be calculated from an input timing of the capture preparation signal PSE. According to example embodiments of the inventive concepts, the predetermined or reference time may be calculated from an input timing of a specific signal (e.g., a half-press shutter signal) when the specific signal is input by a user. For example, when a user does not press a shutter release button during the predetermined or reference time PCT after an operation mode of the camera image sensor is changed from a preview mode 41 to a capture preparation mode 42, it may be determined that a user intends not to press a shutter release button. Thus, the method of FIG. 7 may change an operation mode of the camera image sensor from a capture preparation mode 42 to a preview mode 43. As described above, the method of FIG. 7 may prevent unnecessary power consumption in a preview mode 41 and 43 of the camera image sensor, and may prevent a shutter-lag from being caused when an image is captured in a capture preparation mode 42 of the camera image sensor. Further, the method of FIG. 7 may reduce power consumption of the camera module by limiting a capture preparation mode 42 of the camera image sensor to the predetermined or reference time PCT, a capture preparation mode 42 of the camera image sensor consuming a relatively high power.

The methods described above with reference to FIGS. 1, 3, 5 and 7 may each be performed, for example, by any of the devices described below with reference to FIGS. 11-26.

Figure 9:
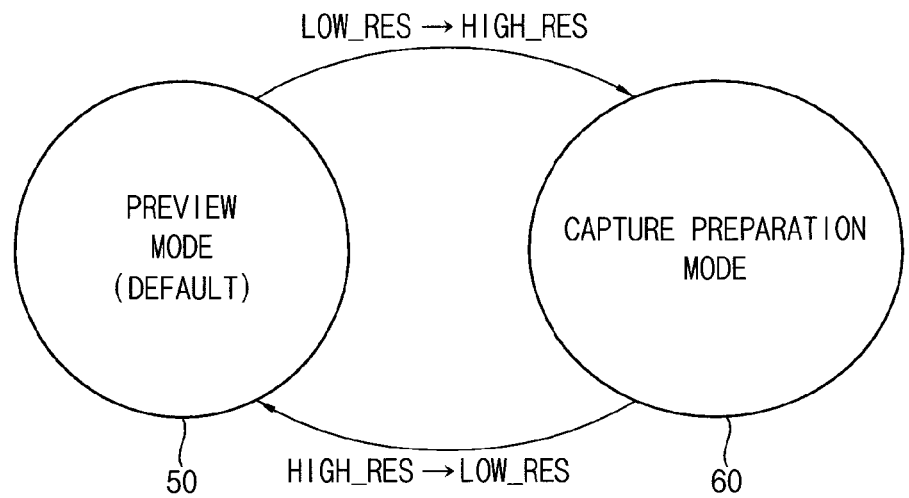
FIG. 9 is a conceptual diagram illustrating a method of eliminating a shutter-lag according to example embodiments.

FIG. 9 is a conceptual diagram illustrating a method of eliminating a shutter-lag according to example embodiments.

Referring to FIG. 9, a camera image sensor in a camera module may operate in a preview mode 50 or in a capture preparation mode 60. A preview mode 50 of the camera image sensor indicates a mode for watching a preview image in real-time. A capture preparation mode 60 of the camera image sensor indicates a mode for preparing an image capture. Here, in a capture preparation mode 60 of the camera image sensor, a user may watch a preview image in real-time until an image capture is started. Image capture may begin, for example, when a user presses a shutter release button. However, a sensor output image may be maintained to have a low resolution in a preview mode 50 of the camera image sensor, and the sensor output image may be maintained to have a high resolution in a capture preparation mode 60 of the camera image sensor. For example, a preview mode 50 of the camera image sensor may be substantially referred to as a low resolution preview mode, and a capture preparation mode 60 of the camera image sensor may be substantially referred to as a high resolution preview mode. For example, a size of the sensor output image having a low resolution may be a VGA (640*480) size, and a size of the sensor output image having a high resolution may be a full-frame size (e.g., 5M (2608*1960), 8M (3264*2448), etc). In conclusion, a method of eliminating a shutter-lag according to example embodiments performs a mode change operation between a preview mode 50 and a capture preparation mode 60.

As described above, a resolution of the sensor output image in a preview mode 50 of the camera image sensor is different from a resolution of the sensor output image in a capture preparation mode 60 of the camera image sensor. In a conventional method, a resolution of the sensor output image is changed from a low resolution to a high resolution based on a capture signal, the capture signal being generated when a user presses a shutter release button. However, since a delay between a timing at which a user presses a shutter release button and a timing at which an image is actually captured, referred to for example as shutter-lag, is caused by the conventional method, the user may not accurately obtain an image of the moment that the user wants. To overcome problems above, a method of eliminating a shutter-lag according to example embodiments may change an operation mode of the camera image sensor from a preview mode 50 to a capture preparation mode 60 in response a capture preparation signal that is related to a focusing operation. According to example embodiments of the inventive concepts, unlike the conventional method, a method of eliminating a shutter-lag according to example embodiments may change an operation mode of the camera image sensor from a preview mode 50 to a capture preparation mode 60 regardless of the capture signal. Here, the capture preparation signal may include an auto-focus start signal, an external input signal, a smile detection signal, and a face detection signal. Examples of the external input signal may include a touch input signal, a button input signal, a sound input signal, etc. In some example embodiments, the capture preparation signal may further include a fingerprint detection signal for performing a fingerprint detecting operation, an object detection signal for performing a specific object detecting operation, etc. A resolution of the sensor output image may be changed from a low resolution (LOW_RES) to a high resolution (HIGH_RES) in response to the capture preparation signal in a preview mode 50 of the camera image sensor. As a result, since the sensor output image already has a high resolution in a capture preparation mode 60 of the camera image sensor, a shutter-lag corresponding to a delay between a timing at which a user presses a shutter release button and a timing at which an image is actually captured may not be caused.

In addition, a method of eliminating a shutter-lag according to example embodiments may change an operation mode of the camera image sensor from a capture preparation mode 60 to a preview mode 50 by various manners. For example, a resolution of the sensor output image may be changed from a high resolution HIGH_RES to a low resolution LOW_RES by various manners in a capture preparation mode 60 of the camera image sensor. According to example embodiments of the inventive concepts, a resolution of the sensor output image may be changed from a high resolution to a low resolution at a capture completion timing of the sensor output image when the sensor output image is captured in a capture preparation mode 60 of the camera image sensor. According to example embodiments of the inventive concepts, a resolution of the sensor output image may be changed from a high resolution to a low resolution when a predetermined or reference time elapses since a capture completion timing of the sensor output image. According to example embodiments of the inventive concepts, a resolution of the sensor output image may be changed from a high resolution to a low resolution when a mode change signal is input in a capture preparation mode 60 of the camera image sensor. According to example embodiments of the inventive concepts, a resolution of the sensor output image may be changed from a high resolution to a low resolution when a predetermined or reference time elapses in a capture preparation mode 60 of the camera image sensor. As described above, a method of eliminating a shutter-lag according to example embodiments may prevent unnecessary power consumption in a preview mode 50 of the camera image sensor, and may prevent a shutter-lag from being caused when an image is captured in a capture preparation mode 60 of the camera image sensor. Further, a method of eliminating a shutter-lag according to example embodiments may minimize a capture preparation mode 60 of the camera image sensor, a capture preparation mode 60 of the camera image sensor consuming a relatively high power.

Figure 10:
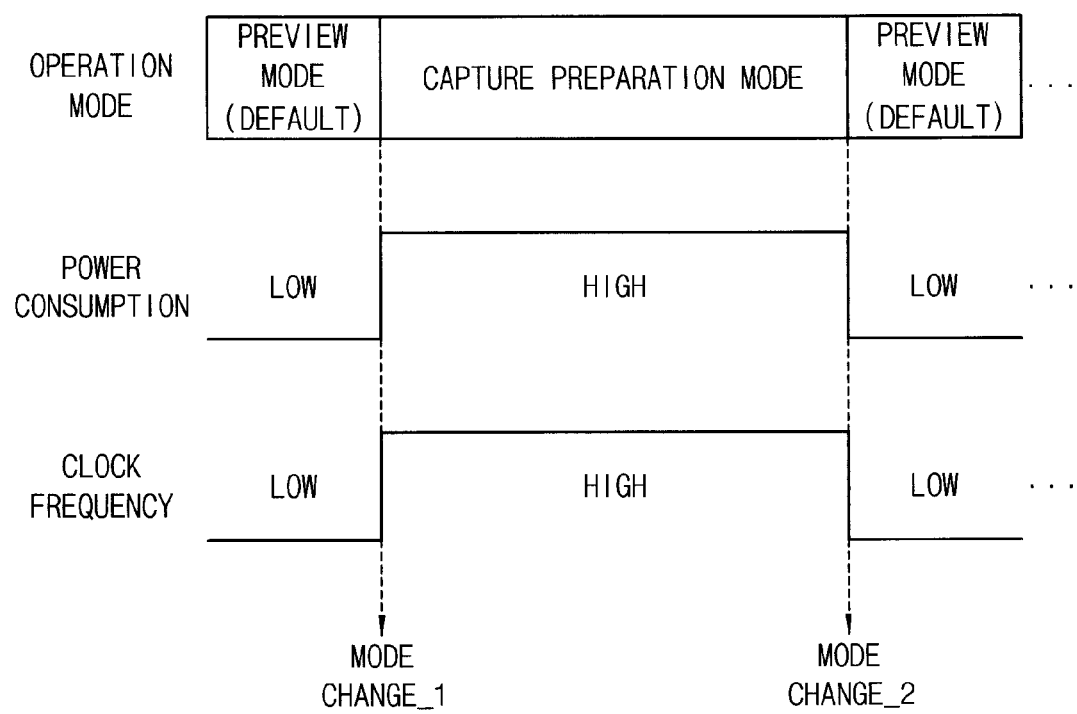
FIG. 10 is a timing diagram illustrating a method of eliminating a shutter-lag according to example embodiments.

FIG. 10 is a timing diagram illustrating a method of eliminating a shutter-lag according to example embodiments.

Referring to FIG. 10, a method of eliminating a shutter-lag according to example embodiments may change an operation mode of the camera image sensor between a preview mode and a capture preparation mode. Here, a first mode change MODE CHANGE_1 indicates that an operation mode of the camera image sensor is changed from a preview mode to a capture preparation mode, and a second mode change MODE CHANGE_2 indicates that an operation mode of the camera image sensor is changed from a capture preparation mode to a preview mode. As illustrated in FIG. 10, since the sensor output image is maintained to have a low resolution in a preview mode of the camera image sensor, a clock frequency for operating the camera image sensor is relatively low, and power consumption for performing the preview mode is relatively low. On the other hand, since the sensor output image is maintained to have a high resolution in a capture preparation mode of the camera image sensor, a clock frequency for operating the camera image sensor is relatively high, and power consumption for performing the capture preparation mode is relatively high. Thus, in order to reduce power consumption of the camera image sensor, it may be desirable to minimize a capture preparation mode that consumes a relatively high amount of power. Thus, a method of eliminating a shutter-lag according to example embodiments may use a capture preparation signal that is desirably generated before a user initiates image capture by, for example pressing a shutter release button.

In detail, the first mode change MODE CHANGE_1 may be performed by changing a resolution of the sensor output image from a low resolution to a high resolution in response to the capture preparation signal when the capture preparation signal is input in a preview mode of the camera image sensor. For example, an operation mode of the camera image sensor may be changed from a preview mode to a capture preparation mode in response to the capture preparation signal. Generally, since a focusing operation is desirably performed when performing an image capture, the capture preparation signal may be a signal related to a focusing operation. For example, the capture preparation signal may include an auto-focus start signal for performing a focusing operation, an external input signal, for example a touch input signal, for performing a focusing operation, a smile detection signal for performing a smile detecting operation, and a face detection signal for performing a face detecting operation. In some example embodiments, the capture preparation signal may further include a fingerprint detection signal for performing a fingerprint detecting operation, an object detection signal for performing a specific object detecting operation, etc. As described above, a method of eliminating a shutter-lag according to example embodiments may perform the first mode change MODE CHANGE_1 using the capture preparation signal before the capture signal is input. As a result, since the sensor output image is maintained to have a high resolution in a capture preparation mode of the camera image sensor, a shutter-lag due to changes of a resolution of the sensor output image may not be caused.

The second mode change MODE CHANGE_2 may be performed by various manners according to required conditions. For example, the second mode change MODE CHANGE_2 may be performed by changing a resolution of the sensor output image from a high resolution to a low resolution. According to example embodiments of the inventive concepts, the second mode change MODE CHANGE_2 may be performed at a capture completion timing of the sensor output image when the sensor output image is captured in a capture preparation mode of the camera image sensor. According to example embodiments of the inventive concepts, the second mode change MODE CHANGE_2 may be performed when a predetermined or reference time elapses since a capture completion timing of the sensor output image. According to example embodiments of the inventive concepts, the second mode change MODE CHANGE_2 may be performed when a mode change signal is input in a capture preparation mode of the camera image sensor. According to example embodiments of the inventive concepts, the second mode change MODE CHANGE_2 may be performed when a predetermined or reference time elapses in a capture preparation mode of the camera image sensor. As described above, a method of eliminating a shutter-lag according to example embodiments may prevent unnecessary power consumption in a preview mode of the camera image sensor, and may prevent a shutter-lag from being caused when an image is captured in a capture preparation mode of the camera image sensor. Further, a method of eliminating a shutter-lag according to example embodiments may minimize a capture preparation mode 60 of the camera image sensor, during which the camera image sensor may consume a relatively high amount of power.

According to example embodiments of the inventive concepts, using a method of measuring a clock frequency for operating the camera module and power consumption for operating the camera module, it may be checked whether a method of eliminating a shutter-lag according to example embodiments is employed by the camera module and an electric device having the camera module. For example, in case that a communication is performed based on Mobile Industry Processor Interface (MIPI), International Telecommunication Union-Radio communication (ITU-R) BT.601, ITU-R BT.656, or ITU-R BT.709 for the camera module, for example between an application processor and a camera image sensor, it may be checked whether a method of eliminating a shutter-lag according to example embodiments is employed by the camera module and an electric device having the camera module by measuring a clock frequency and power consumption for performing MIPI, ITU-R BT.601, ITU-R BT.656, or ITU-R BT.709 for the camera module.

Figure 11:
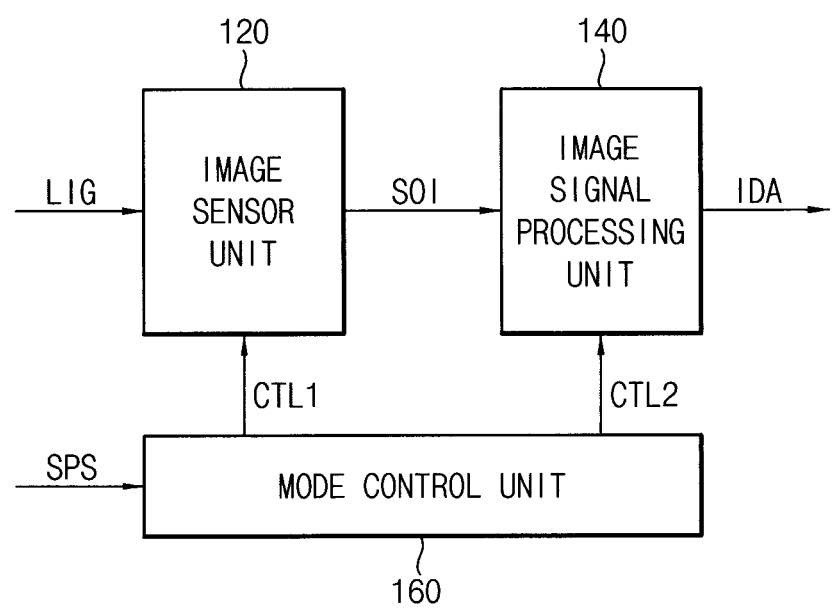
FIG. 11 is a block diagram illustrating a camera module according to example embodiments.

FIG. 11 is a block diagram illustrating a camera module according to example embodiments.

Referring to FIG. 11, the camera module 100 may include an image sensor unit 120, an image signal processing unit 140, and a mode control unit 160. In some example embodiments, the camera module 100 may be implemented by a System-On-Chip (SOC).

The image sensor unit 120 may generate a sensor output image SOI by receiving a light signal LIG corresponding to a subject for photography, and by performing a photoelectric transformation on the light signal LIG. For this operation, the image sensor unit 120 may include at least one image sensor, and the image sensor may be a Complementary Metal-Oxide Semiconductor (CMOS) image sensor or a Charge Coupled Device (CCD) image sensor. Based on a control signal CTL1 output from the mode control unit 160, the sensor output image SOI may have a low resolution in a preview mode, and may have a high resolution in a capture preparation mode. Here, it should be understood that a "resolution" of the sensor output image SOI is a term which may include a "pixel" of the sensor output image SOI, a "size" of the sensor output image SOI, a "capacity" of the sensor output image SOI, a "sampling rate" of the sensor output image SOI, etc. According to example embodiments of the inventive concepts, a size of the sensor output image SOI having a low resolution may correspond to a display output size. For example, a size of the sensor output image SOI having a low resolution may be a VGA (640*480) size. In addition, as a display output size is changed, a size of the sensor output image SOI having a low resolution may be changed. For example, when a mobile device having the camera module 100 is coupled to an external display device, a size of the sensor output image SOI having a low resolution may be changed to be a display output size of the external display device. In addition, a size of the sensor output image SOI having a high resolution may correspond to a predetermined size, and the predetermined size may be changed by a user. For example, a size of the sensor output image SOI having a high resolution may be a full-frame size (e.g., 5M (2608*1960), 8M (3264*2448), etc). The image sensor unit 120 may provide the sensor output image SOI of which a resolution is changed according to an operation mode of the camera module 100 or an operation of a camera image sensor. In some example embodiments, when an operation mode of the camera module 100 is changed, the image sensor unit 120 may output an interrupt signal to the image signal processing unit 140 to ensure a continuity of the sensor output image SOI.

The image signal processing unit 140 may process the sensor output image SOI output from the image sensor unit 120 to generate an image data IDA. For this operation, the image signal processing unit 140 may include at least one image signal processor (ISP). For example, the image signal processing unit 140 may perform a processing for an auto exposure (AE), an auto white balance (AWB), an auto focus (AF), etc. In addition, the image signal processing unit 140 may further perform a processing for a scaler, an output format, a color correction, a gamma correction, a shading compensation, etc. In detail, the image signal processing unit 140 may process the sensor output image SOI having a low resolution or the sensor output signal SOI having a high resolution based on a control signal CTL2 output from the mode control unit 160. For example, when the sensor output image SOI having a low resolution is input from the image sensor unit 120 in a preview mode, the image signal processing unit 140 may process the sensor output image SOI having a low resolution to output the image data IDA that is suitable for a preview mode. On the other hand, when the sensor output image SOI having a high resolution is input from the image sensor unit 120 in a capture preparation mode, the image signal processing unit 140 may process the sensor output image SOI having a high resolution to output the image data IDA that is suitable for a capture preparation mode. In some example embodiments, the image sensor unit 120 is coupled to the image signal processing unit 140 based on MIPI and Inter-Integrated Circuit (I2C). However, it is not limited thereto.

The mode control unit 160 may change an operation mode of the camera module 100 from a preview mode to a capture preparation mode based on a capture preparation signal SPS. In detail, when the capture preparation signal SPS is input in a preview mode, the mode control unit 160 may change a resolution of the sensor output image SOI output from the sensor image unit 120 from a low resolution to a high resolution by outputting the control signal CTL1 to the image sensor unit 120. Generally, since a focusing operation is necessarily performed when performing an image capture, the capture preparation signal SPS may be a signal related to a focusing operation of the camera module 100. According to example embodiments of the inventive concepts, the capture preparation signal SPS may be an auto-focus start signal for performing a focusing operation. According to example embodiments of the inventive concepts, the capture preparation signal SPS may be an external input signal, for example, a touch input signal, for performing a focusing operation. According to example embodiments of the inventive concepts, the capture preparation signal SPS may be a smile detection signal for performing a smile detecting operation. According to example embodiments of the inventive concepts, the capture preparation signal SPS may be a face detection signal for performing a face detecting operation. Since the mode control unit 160 uses the capture preparation signal SPS that is necessarily generated in the camera module before a user presses a shutter release button, the mode control unit 160 may control the sensor output image SOI to have a high resolution when a user presses a shutter release button in a capture preparation mode. As a result, a shutter-lag corresponding to a delay between a timing at which a user presses a shutter release button and a timing at which an image is actually captured may not be caused because the sensor output image SOI is maintained to have a high resolution in a capture preparation mode.

Further, the mode control unit 160 may change an operation mode of the camera module 100 from a capture preparation mode to a preview mode by various manners according to one or more conditions. As described above, the image sensor unit 120 may output the sensor output image SOI having a low resolution in a preview mode, and may output the sensor output image SOI having a high resolution in a capture preparation mode. Thus, the mode control unit 120 may need to change an operation mode of the camera module 100 from a capture preparation mode to a preview mode under a specific condition. According to example embodiments of the inventive concepts, the mode control unit 160 may change an operation mode of the camera module 100 from a capture preparation mode to a preview mode at a capture completion timing of the sensor output image SOI when the sensor output image SOI is captured in a capture preparation mode. According to example embodiments of the inventive concepts, the mode control unit 160 may change an operation mode of the camera module 100 from a capture preparation mode to a preview mode when a predetermined or reference time elapses since a capture completion timing of the sensor output image SOI. According to example embodiments of the inventive concepts, the mode control unit 160 may change an operation mode of the camera module 100 from a capture preparation mode to a preview mode when a mode change signal is input in a capture preparation mode. According to example embodiments of the inventive concepts, the mode control unit 160 may change an operation mode of the camera module 100 from a capture preparation mode to a preview mode when a predetermined or reference time elapses in a capture preparation mode. As a result, the mode control unit 160 may reduce power consumption of the camera module 100 by changing an operation mode of the camera module 100 from a capture preparation mode to a preview mode under a specific condition, a capture preparation mode consuming a relatively high power.

As described above, the mode control unit 160 may control the image sensor unit 120 and the image signal processing unit 140 by outputting the control signals CTL1 and CTL2 to the image sensor unit 120 and the image signal processing unit 140. Hence, the image sensor unit 120 may output the sensor output image SOI having a low resolution in a preview mode, and may output the sensor output image SOI having a high resolution in a capture preparation mode. In addition, the image signal processing unit 140 may process and output the sensor output image SOI having a low resolution in a preview mode, and may process and output the sensor output image SOI having a high resolution in a capture preparation mode. As a result, the camera module 100 may prevent unnecessary power consumption in a preview mode, and may prevent a shutter-lag from being caused when an image is captured in a capture preparation mode. In addition, the camera module 100 may minimize a capture preparation mode that consumes a relatively high power. According to example embodiments of the inventive concepts, the image signal processing unit 140 and/or the mode control unit 160 may be implemented inside an application processor. According to example embodiments of the inventive concepts, the image signal processing unit 140 and/or the mode control unit 160 may be implemented outside the application processor. In mobile device, it may be desirable for the image signal processing unit 140 and/or the mode control unit 160 to be implemented inside the application processor. In this case, the mode control unit 160 may include a real-time operation system (RTOS), and the image signal processing unit 140 may be controlled by the RTOS.

Figure 12:
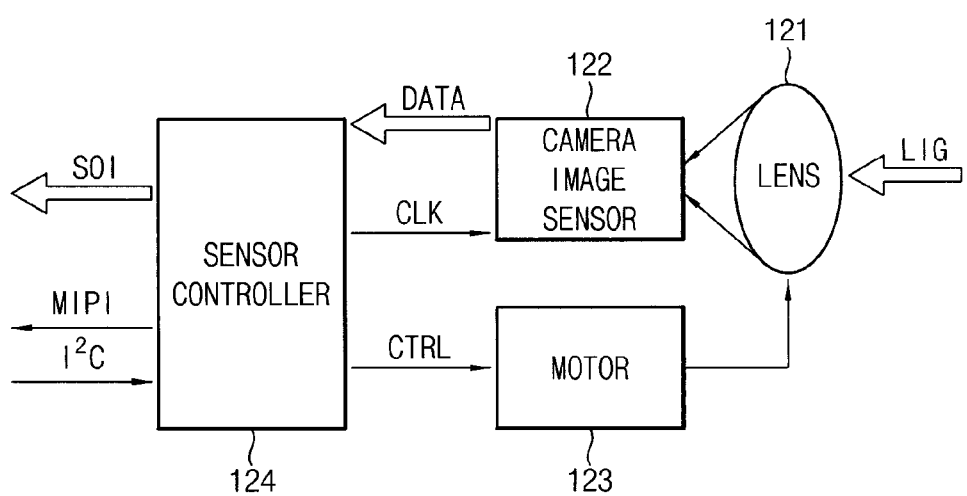
FIG. 12 is a block diagram illustrating an example of an image sensor unit in a camera module of FIG. 11.

FIG. 12 is a block diagram illustrating an example of an image sensor unit in a camera module of FIG. 11.

Referring to FIG. 12, the image sensor unit 120 may include a lens 121, a camera image sensor 122, a motor 123, and a sensor controller 124.

The lens 121 may concentrate light (i.e., a light signal LIG corresponding to a subject for photography) on light-receiving regions (e.g., a plurality of unit pixels included in a unit pixel array). The camera image sensor 122 may generate a data DATA having information of the subject based on the light signal LIG input through the lens 121. In some example embodiments, the camera image sensor 122 may be a CMOS image sensor or a CCD image sensor. The camera image sensor 122 may provide the data DATA to the sensor controller 124 based on a clock signal CLK. The motor 123 may perform a focusing operation or a shuttering operation of the lens 121 based on a control signal CTRL provided from the sensor controller 124. The sensor controller 124 may control the camera image sensor 122 and the motor 123, and may process the data DATA input from the camera image sensor 122 to output the sensor output image SOI. Meanwhile, the sensor controller 124 may be coupled to an image signal processor (ISP) of the image signal processing unit 140 to provide the sensor output image SOI to the image signal processor of the image signal processing unit 140. In some example embodiments, the sensor controller 124 may be coupled to the image signal processor of the image signal processing unit 140 based on MIPI and I2C bus. However, it is not limited thereto.

As described above, the image sensor unit 120 may receive the light signal LIG, and may generate the sensor output image SOI by performing a photoelectric transformation on the light signal LIG. Here, the sensor output image SOI may have a low resolution in a preview mode, and may have a high resolution in a capture preparation mode. A size of the sensor output image SOI having a low resolution may correspond to a display output size, and a size of the sensor output image SOI having a low resolution may be changed as the display output size is changed. A size of the sensor output image SOI having a high resolution may correspond to a predetermined size, and the predetermined size may be changed by a user. In conclusion, an operation mode of the camera module 100 may be changed from a preview mode to a capture preparation mode based on the capture preparation signal SPS. As a result, the image sensor unit 120 may output the sensor output image SOI having a high resolution when a user presses a shutter release button in a capture preparation mode. In addition, an operation mode of the camera module 100 may be changed from a capture preparation mode to a preview mode by various manners according to required conditions. As a result, power consumption of the camera module 100 may be reduced because a capture preparation mode in which the image sensor unit 120 outputs the sensor output image SOI having a high resolution is minimized.

Figure 13:
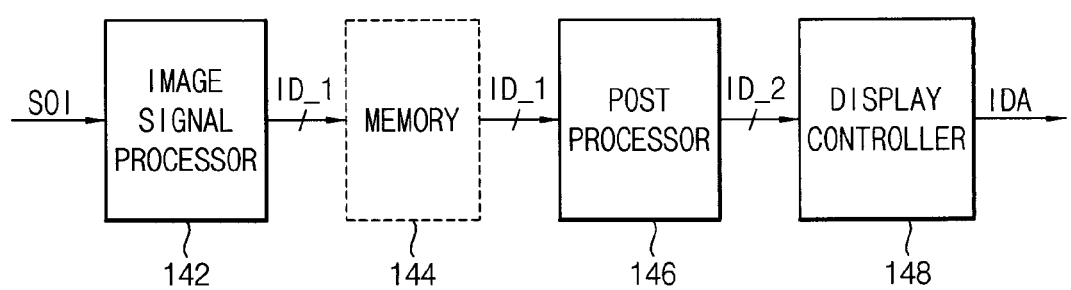
FIG. 13 is a block diagram illustrating an example of an image signal processing unit in a camera module of FIG. 11.

FIG. 13 is a block diagram illustrating an example of an image signal processing unit in a camera module of FIG. 11.

Referring to FIG. 13, the image signal processing unit 140 may include an image signal processor 142, a memory device 144, a post-processor 146, and a display controller 148.

The image signal processor 142 may receive the sensor output image SOI output from the image sensor unit 120, and may generate a first image data ID_1 by processing the sensor output image SOI. Substantially, the sensor output image SOI output from the image sensor unit 120 may not be recognized by a user. Thus, the image signal processor 142 may convert the sensor output image SOI into a signal that can be recognized by a user, for example the first image data ID_1. For example, the image signal processor 142 may generate the first image data ID_1 by controlling a color type, an image size, a frame speed, etc of the sensor output image SOI output from the image sensor unit 120. In FIG. 13, it is illustrated that the image signal processor 142 performs a function of a pre-processor. However, the pre-processor may be independently included in the image signal processing unit 140. In this case, the pre-processor may convert the first image data ID_1 into a signal that is suitable for the post-processor 146.

The memory device 144 may temporarily store the sensor output image SOI output from the image signal processor 142, and may output the sensor output image SOI to the post-processor 146. For example, the memory device 144 may include a volatile memory device such as a dynamic random access memory (DRAM) device, a static random access memory (SRAM) device, etc, and a non-volatile memory device such as an erasable programmable read-only memory (EPROM) device, an electrically erasable programmable read-only memory (EEPROM) device, a flash memory device, etc. The memory device 144 may perform a buffer-function. In some example embodiments, the memory device 144 may not be included in the image signal processing unit 140 according to required conditions. The post-processor 146 may generate a second image data ID_2 by post-processing the first image data ID_1 output from the image signal processor 142. For example, the post-processor 146 may convert the first image data ID_1 which is, for example, input from the image signal processor 142 or a pre-processor, to the second image data ID_2 that can be displayed on a display device by the display controller 148. Next, the display controller 148 may display the second image data ID_2 as the image data IDA on the display device.

The image signal processing unit 140 may output the image data IDA by processing the sensor output image SOI output from the image sensor unit 120. In some example embodiments, the image data IDA may be output based on various codec (e.g., JPEG, TIF, GIF, PCX, etc). According to example embodiments of the inventive concepts, the image signal processing unit 140 may be implemented inside an application processor. According to example embodiments of the inventive concepts, the image signal processing unit 140 may be implemented outside the application processor. For example, in case that the image signal processing unit 140 is implemented inside the application processor, a delay may not be caused when the image signal processing unit 140 communicates with the mode control unit 160. Thus, if the mode control unit 160 includes the RTOS, the image signal processing unit 140 may be controlled by the RTOS. As described above, based on the control signal CTL2 output from the mode control unit 160, the image signal processing unit 140 may process the sensor output image SOI having a low resolution in a preview mode, and may process the sensor output image SOI having a high resolution in a capture preparation mode. As a result, the camera module 100 may reduce power consumption for a preview mode.

Figure 14:
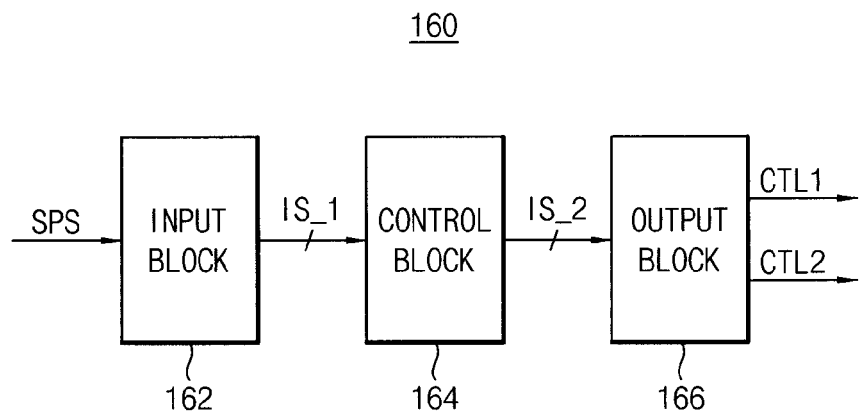
FIG. 14 is a block diagram illustrating an example of a mode control unit in a camera module of FIG. 11.

FIG. 14 is a block diagram illustrating an example of a mode control unit in a camera module of FIG. 11.

Referring to FIG. 14, the mode control unit 160 may include an input block 162, a control block 164, and an output block 166.

The input block 162 may receive a capture preparation signal SPS, and may output a first internal signal IS_1 to the control block 164. Here, the capture preparation signal SPS may include an auto-focus start signal for performing a focusing operation, an external input signal (e.g., a touch input signal) for performing a focusing operation, a smile detection signal for performing a smile detecting operation, and a face detection signal for performing a face detecting operation. Hence, the input block 162 may provide the internal signal IS_1 corresponding to the auto-focus start signal, the external input signal, the smile detection signal, or the face detection signal to the control block 164 based on the capture preparation signal SPS. The control block 164 may generate a second internal signal IS_2 for controlling the image sensor unit 120 and the image signal processing unit 140 based on the first internal signal IS_1, and may provide the second internal signal IS_2 to the output block 166. Here, the second internal signal IS_2 may correspond to the control signals CTL1 and CTL2 for controlling the image sensor unit 120 and the image signal processing unit 160. Next, the output block 166 may provide the control signals CTL1 and CTL2 to the image sensor unit 120 and the image signal processing unit 140 based on the second internal signal IS_2.

The mode control unit 160 may change an operation mode of the camera module 100 from a preview mode to a capture preparation mode based on the capture preparation signal SPS. In addition, the mode control unit 160 may change an operation mode of the camera module 100 from a capture preparation mode to a preview mode under a specific condition. As described above, the mode control unit 160 may control the image sensor unit 120 to output the sensor output image SOI having a low resolution in a preview mode, and may control the image signal processing unit 140 to process the sensor output image SOI having a low resolution in a preview mode. On the other hand, the mode control unit 160 may control the image sensor unit 120 to output the sensor output image SOI having a high resolution in a capture preparation mode, and may control the image signal processing unit 140 to output the sensor output image SOI having a high resolution in a capture preparation mode. As a result, the camera module 100 may prevent unnecessary power consumption in a preview mode, and may prevent a shutter-lag from being caused when an image is captured in a capture preparation mode. Further, the camera module 100 may minimize a capture preparation mode that consumes a relatively high power.

Figure 15:
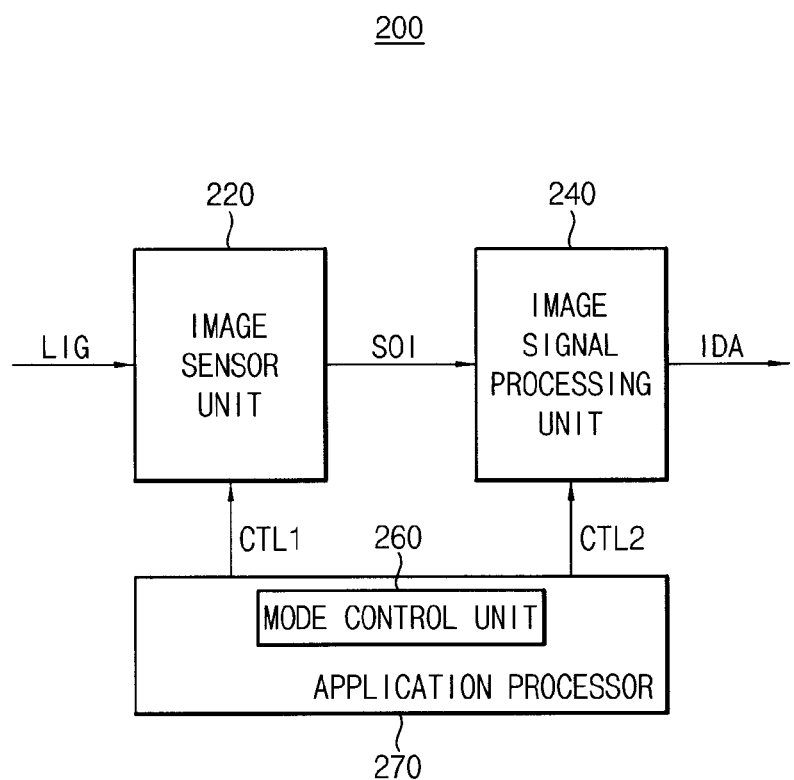
FIG. 15 is a block diagram illustrating an example in which a camera module of FIG. 11 is applied to a mobile device.

FIG. 15 is a block diagram illustrating an example in which a camera module of FIG. 11 is applied to a mobile device.

Referring to FIG. 15, the camera module 200 may include an image sensor unit 220, an image signal processing unit 240, and a mode control unit 260. Here, the mode control unit 260 may be included in an application processor 270. According to example embodiments of the inventive concepts, the camera module 200 may be implemented by a system on chip (SOC).

The image sensor unit 220 may generate a sensor output image SOI by receiving a light signal LIG corresponding to a subject for photography, and by performing a photoelectric transformation on the light signal LIG. The image signal processing unit 240 may process the sensor output image SOI output from the image sensor unit 220 to generate an image data IDA. The mode control unit 260 may change an operation mode of the camera module 200 from a preview mode to a capture preparation mode based on a capture preparation signal SPS. Since the image sensor unit 220, the image signal processing unit 240, and the mode control unit 260 are described above, duplicated descriptions will be omitted below. As illustrated in FIG. 15, the mode control unit 260 may be included in the application processor 270. Generally, since a mobile device may operate based primarily on a battery, the mobile device needs to consume less power as the mobile device is getting smaller. Examples of a mobile device may include a smart phone, a smart pad, a PDA, and a portable game console. Hence, the mobile device may include an application processor for performing various functions. For example, the application processor of the mobile device may correspond to a central processing unit (CPU) of a computer. Therefore, the application processor 270 may include the mode control unit 260 that changes an operation mode of the camera module 200 from a preview mode to a capture preparation mode based on the capture preparation signal SPS. In this case, a delay that is caused when the application processor 270 communicates with the mode control unit 260 may be minimized.

As described above, the application processor 270 having the mode control unit 260 may change an operation mode of the camera module 200 from a preview mode to a capture preparation mode by outputting a control signal CTL1 to the image sensor unit 220 when the capture preparation signal SPS is input in a preview mode. Thus, the image sensor unit 220 may output the sensor output image SOI having a low resolution in a preview mode, and then may output the sensor output image SOI having a high resolution since a start timing of a capture preparation mode (i.e., since an input timing of the capture preparation signal SPS). As a result, a shutter-lag corresponding to a delay between a timing at which a user presses a shutter release button and a timing at which an image is actually captured may not be caused. In addition, the application processor 270 having the mode control unit 260 may change an operation mode of the camera module 200 from a capture preparation mode to a preview mode by outputting the control signal CTL1 to the image sensor unit 220 under a specific condition. For example, when the sensor output image is captured in a capture preparation mode, when a predetermined or reference time elapses in a capture preparation mode, or when a mode change signal is input in a capture preparation mode. As a result, power consumption of the camera module 200 may be reduced because a capture preparation mode in which the image sensor unit 220 outputs the sensor output image SOI having a high resolution is minimized. In some example embodiments, the mode control unit 260 may include a real-time operation system (RTOS), and the image signal processing unit 240 may be controlled by the RTOS.

Figure 16:
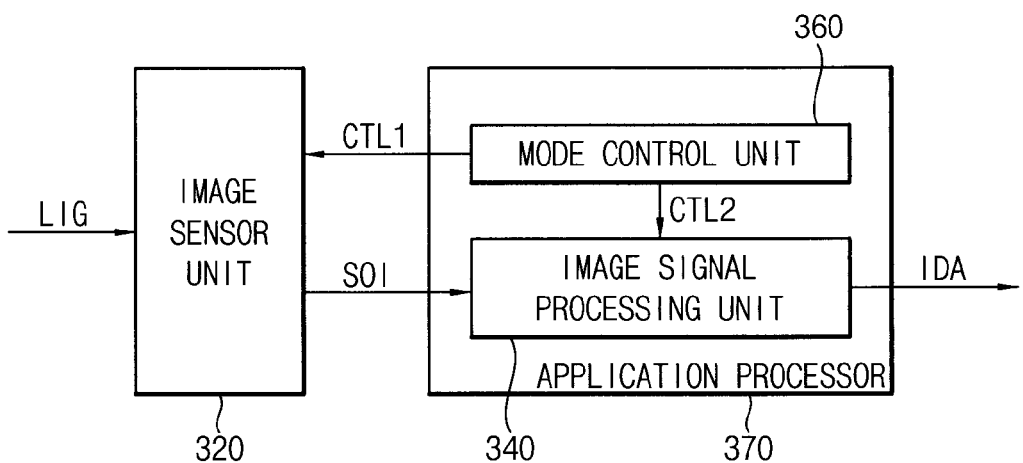
FIG. 16 is a block diagram illustrating another example in which a camera module of FIG. 11 is applied to a mobile device.

FIG. 16 is a block diagram illustrating another example in which a camera module of FIG. 11 is applied to a mobile device.

Referring to FIG. 16, the camera module 300 may include an image sensor unit 320, an image signal processing unit 340, and a mode control unit 360. Here, the image signal processing unit 340 and the mode control unit 360 may be included in an application processor 370. In some example embodiments, the camera module 300 may be implemented by a System-On-Chip (SOC).

The image sensor unit 320 may generate a sensor output image SOI by receiving a light signal LIG corresponding to a subject for photography, and by performing a photoelectric transformation on the light signal LIG. The image signal processing unit 340 may process the sensor output image SOI output from the image sensor unit 220 to generate an image data IDA. The mode control unit 360 may change an operation mode of the camera module 300 from a preview mode to a capture preparation mode based on a capture preparation signal SPS. Since the image sensor unit 320, the image signal processing unit 340, and the mode control unit 360 are described above, duplicated descriptions will be omitted below. As illustrated in FIG. 16, the image signal processing unit 340 and the mode control unit 360 may be included in the application processor 370. For example, the application processor 370 may include the mode control unit 360 that changes an operation mode of the camera module 300 from a preview mode to a capture preparation mode based on the capture preparation signal SPS, and the image signal processing unit 340 that outputs the image data IDA by processing the sensor output image SOI output from the image sensor unit 320. In this case, a delay that is caused when the application processor 370 communicates with the image signal processing unit 340 and the mode control unit 360 may be minimized.

Figure 17:
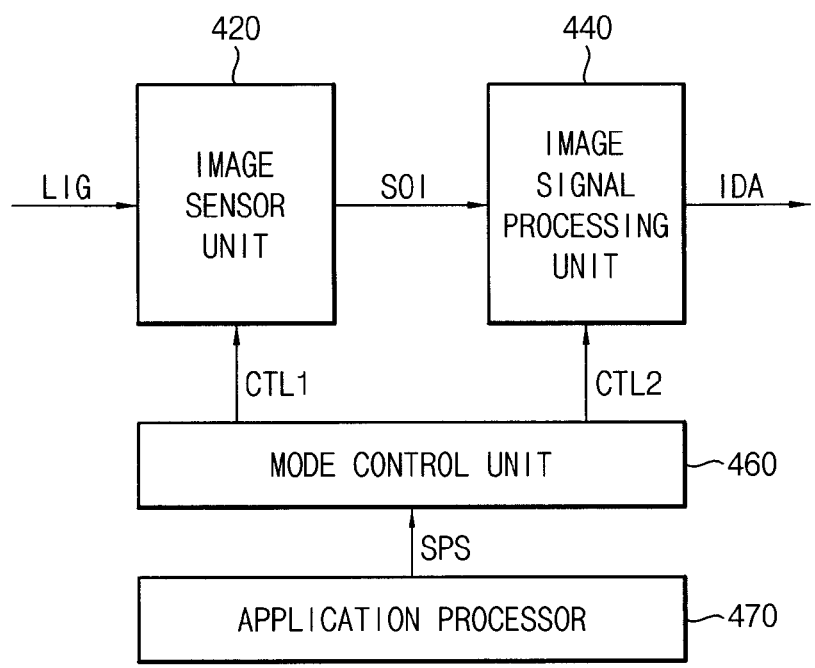
FIG. 17 is a block diagram illustrating still another example in which a camera module of FIG. 11 is applied to a mobile device.

FIG. 17 is a block diagram illustrating still another example in which a camera module of FIG. 11 is applied to a mobile device.

Referring to FIG. 17, the camera module 400 may include an image sensor unit 420, an image signal processing unit 440, and a mode control unit 460. Here, the mode control unit 460 may be coupled to an application processor 470. For example, the mode control unit 460 may be a processor that is independent of the application processor 470. In some example embodiments, the camera module 400 may be implemented by a System-On-Chip (SOC).

The image sensor unit 420 may generate a sensor output image SOI by receiving a light signal LIG corresponding to a subject for photography, and by performing a photoelectric transformation on the light signal LIG. The image signal processing unit 440 may process the sensor output image SOI output from the image sensor unit 420 to generate an image data IDA. The mode control unit 460 may change an operation mode of the camera module 400 from a preview mode to a capture preparation mode based on a capture preparation signal SPS. Since the image sensor unit 420, the image signal processing unit 440, and the mode control unit 460 are described above, duplicated descriptions will be omitted below. As illustrated in FIG. 17, the mode control unit 460 may be a processor that is independent of the application processor 470. For example, the mode control unit 460 may be coupled to the application processor 470, and may change an operation mode of the camera module 400 from a preview mode to a capture preparation mode based on a capture preparation signal SPS output from the application processor 470. Generally, an application processor may perform a multi-tasking operation for a mobile device. Hence, a camera module of the mobile device may malfunction when the application processor is overloaded. Thus, the camera module 400 may achieve operational reliability because the mode control unit 460 is independently implemented from the application processor 470.

Figure 18:
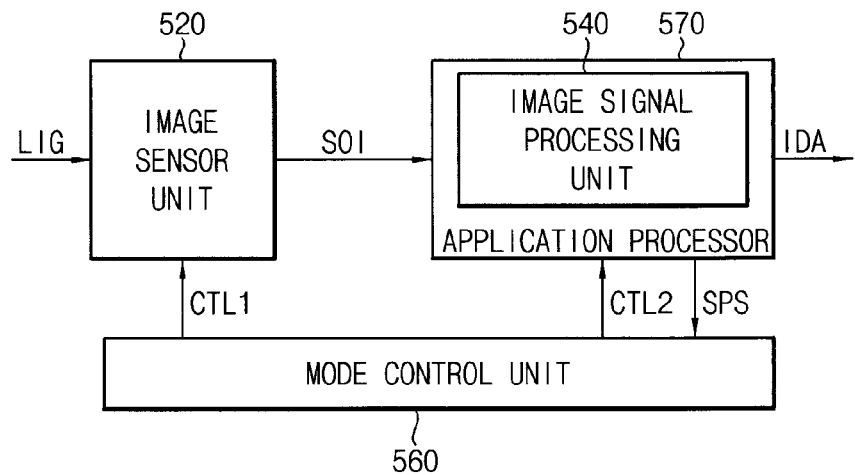
FIG. 18 is a block diagram illustrating still another example in which a camera module of FIG. 11 is applied to a mobile device.

FIG. 18 is a block diagram illustrating still another example in which a camera module of FIG. 11 is applied to a mobile device.

Referring to FIG. 18, the camera module 500 may include an image sensor unit 520, an image signal processing unit 540, and a mode control unit 560. Here, the mode control unit 560 may be coupled to an application processor 570. For example, the mode control unit 560 may be a processor that is independent of the application processor 570. In addition, the image signal processing unit 540 may be included in the application processor 570. In some example embodiments, the camera module 500 may be implemented by a System-On-Chip (SOC).

The image sensor unit 520 may generate a sensor output image SOI by receiving a light signal LIG corresponding to a subject for photography, and by performing a photoelectric transformation on the light signal LIG. The image signal processing unit 540 may process the sensor output image SOI output from the image sensor unit 520 to generate an image data IDA. The mode control unit 560 may change an operation mode of the camera module 500 from a preview mode to a capture preparation mode based on a capture preparation signal SPS. Since the image sensor unit 520, the image signal processing unit 540, and the mode control unit 560 are described above, duplicated descriptions will be omitted below. As illustrated in FIG. 18, the application processor 570 may include the image signal processing unit 540 that outputs the image data IDA by processing the sensor output image SOI output from the image sensor unit 520. However, the mode control unit 560 may be a processor that is independent of the application processor 570, and may be coupled to the application processor 570. As a result, a delay that is caused when the application processor 570 communicates with the image signal processing unit 540 may be minimized. Furthermore, the camera module 500 may achieve operational reliability because the mode control unit 560 is independently implemented from the application processor 570.

Figure 19:
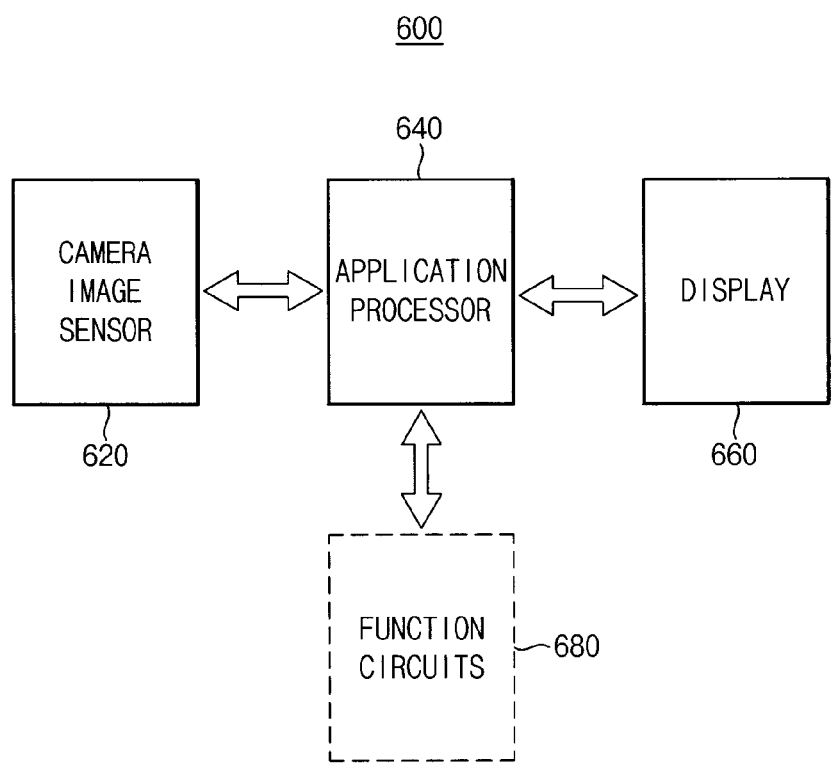
FIG. 19 is a block diagram illustrating a mobile device according to example embodiments.

FIG. 19 is a block diagram illustrating a mobile device according to example embodiments.

Referring to FIG. 19, the mobile device 600 may include a camera image sensor 620, an application processor 640, and at least one display device 660. In some example embodiments, the mobile device 600 may further include a plurality of function circuits 680 for performing various functions for the mobile device 600.

The mobile device 600 may perform various functions according to a mobile convergence tendency. As illustrated in FIG. 19, the mobile device 600 may include a camera module for performing a camera function. Here, except for the camera image sensor 620, all components of the camera module may be included in the application processor 640 of the mobile device 600. According to example embodiments of the inventive concepts, the application processor 640 may include a mode controller, an image signal processor, a post-processor, and a display controller. The mode controller may maintain a sensor output image to have a low resolution in a preview mode, may change a resolution of the sensor output image from a low resolution to a high resolution in response to a capture preparation signal, and may maintain the sensor output image to have a high resolution in a capture preparation mode. Here, the sensor output image may be output from the camera image sensor 620. The image signal processor may process the sensor output image to generate a first image data. The post-processor may post-process the first image data to generate a second image data. The display controller may output the second image data to at least one display device. Here, the mode controller of the application processor 640 may correspond to the mode control unit 160 of FIG. 11, and the image signal processor, the post-processor, and the display controller of the application processor 640 may correspond to the image signal processing unit 140 of FIG. 11.

As is described above, the mobile device 600 may include the application processor 640 for performing various functions for the mobile device 600, and the application processor 640 may include the mode controller that change an operation mode of the camera module from a preview mode to a capture preparation mode in response to the capture preparation signal, and components that process the sensor output image to output the image data, the components including, for example, the image signal processor, the post-processor, and the display controller. Hence, a delay that is caused when the application processor 640 communicates with the mode controller, the image signal processor, the post-processor, and the display controller may be minimized. Meanwhile, the application processor 640 may be coupled to the function circuits 680 for performing specific functions of the mobile device 600, respectively. Thus, the application processor 640 may control the function circuits 680. In conclusion, when the camera module operates in the mobile device 600, the sensor output image may be maintained to have a low resolution in a preview mode, a resolution of the sensor output image may be changed from a low resolution to a high resolution in response to the capture preparation signal, and the sensor output image may be maintained to have a high resolution in a capture preparation mode. As a result, the mobile device 600 may prevent unnecessary power consumption in a preview mode of the camera module, and may prevent a shutter-lag from being caused when an image is captured in a capture preparation mode of the camera module. Further, the mobile device 600 may minimize a capture preparation mode of the camera module that consumes a relatively high power.

Figure 20:
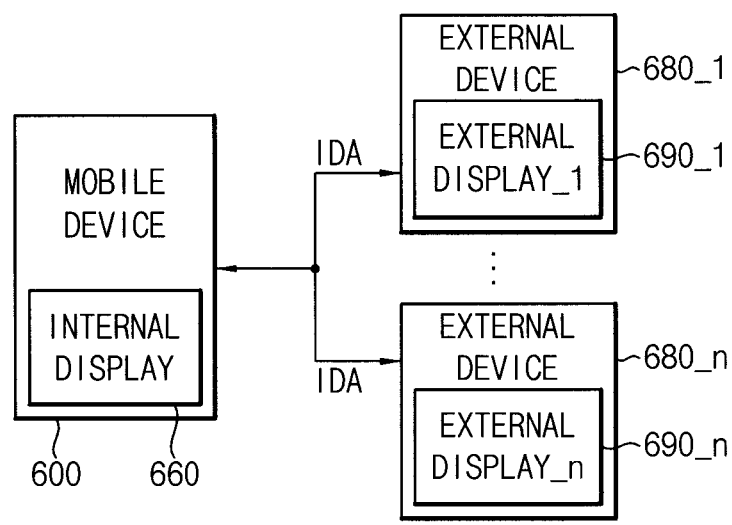
FIG. 20 is a diagram illustrating an example in which a mobile device of FIG. 19 is coupled to at least one external display device.
Figure 21:
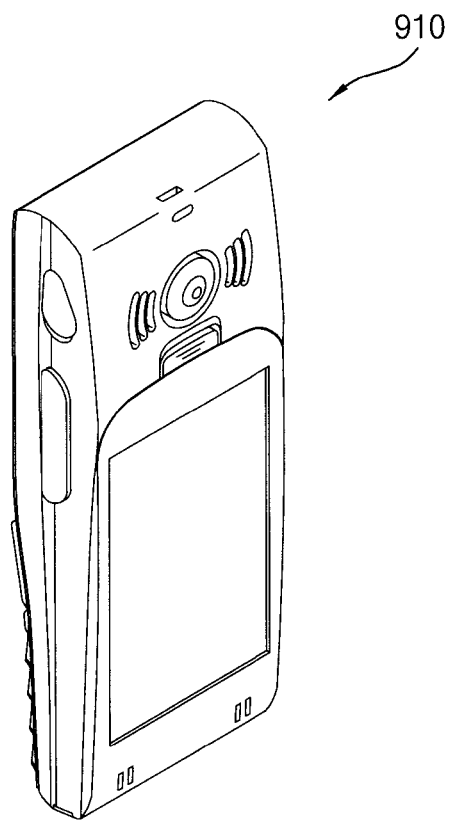
FIGS. 21 through 24 are diagrams illustrating various examples implemented by a mobile device of FIG. 19.
Figure 22:
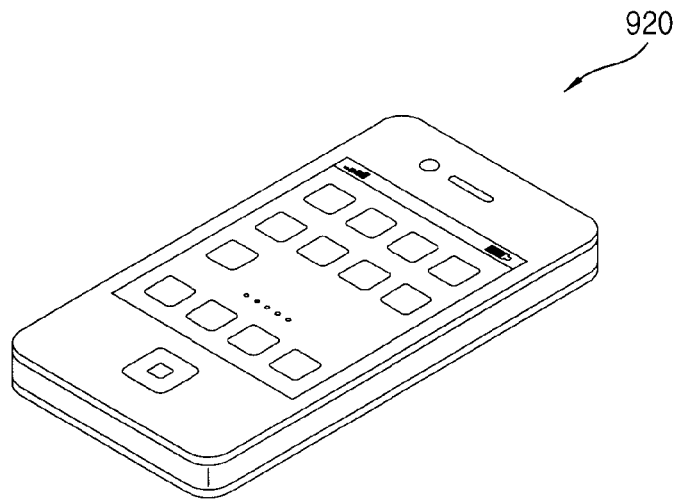
Figure 23:
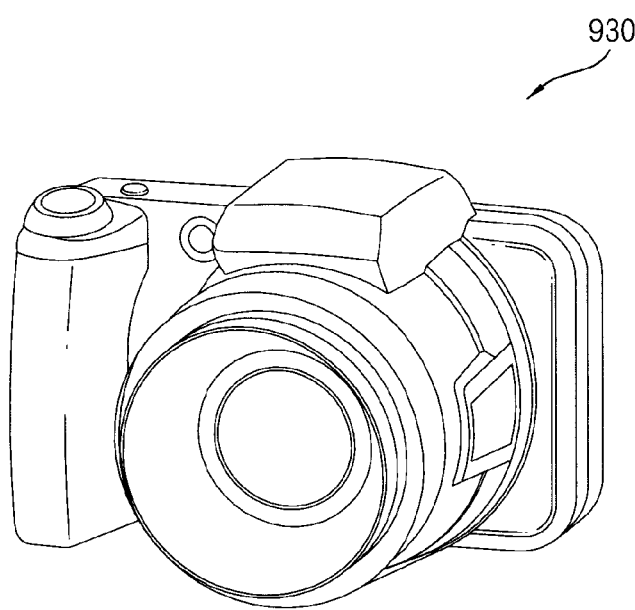
Figure 24:
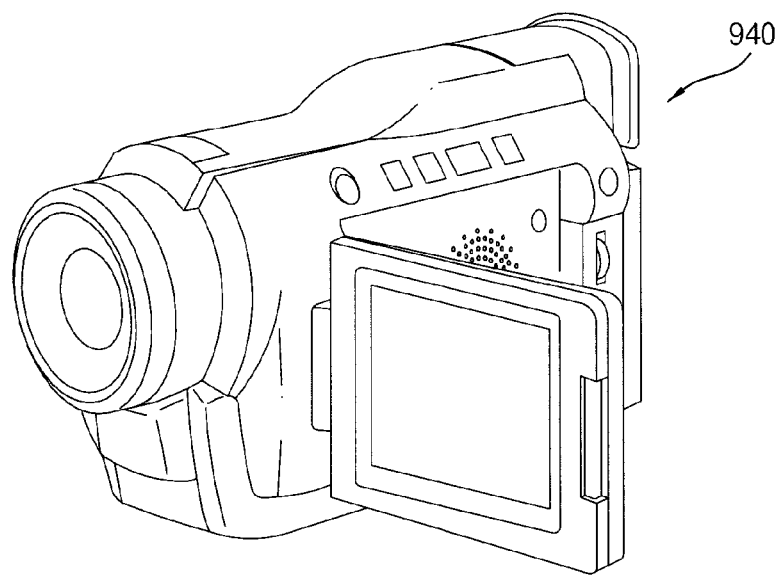

FIG. 20 is a diagram illustrating an example in which a mobile device of FIG. 19 is coupled to at least one external display device.

Referring to FIG. 20, the mobile device 600 may include at least one internal display device 660, and may be coupled to external display devices 690_1 through 690_n. Here, the external display devices 690_1 through 690_n may be the respective internal display devices of the external devices 680_1 through 680_n. For instance, when the mobile device 600 is a smart phone, the internal display device 660 may correspond to a liquid crystal display (LCD) device of the smart phone, or an active matrix organic light emitting diodes (AMOLED) display device of the smart phone. The external devices 680_1 through 680_n may each correspond to a laptop, a television, a monitor, a projector, etc that can be connected to the smart phone in a wireless manner or a wired manner. Thus, when the mobile device 600 performs a camera function, a subject for photography may also be displayed on the external display device 690_1 through 690_n coupled to the mobile device 600 while the subject for photography is displayed on the internal display device 660. For this operation, the mobile device 600 may provide an image data IDA to the external device 680_1 through 680_n. Since the mobile device 600 shares the image data IDA with the external device 680_1 through 680_n, a user having the mobile device 600 and a user having the external device 680_1 through 680_n may watch the same image in real-time. According to example embodiments of the inventive concepts, as a user having the mobile device 600 watches and chooses a subject for photography on the internal display device 660, a user having one of the external devices 680_1 through 680_n may press a shutter release button to perform an image capture of the subject for photography that is displayed on the corresponding one of the external display devices 690_1 through 690_n. As a result, the mobile device 600 may be used for various applications such as a video telephone conversation, a video conference, a remote control, etc.

FIGS. 21 through 24 are diagrams illustrating various examples implemented by a mobile device of FIG. 19.

Referring to FIGS. 21 through 24, the mobile device 600 may be implemented as a cellular phone 910, a smart phone 920, a digital camera 930, a camcorder 940, etc. As described above, the mobile device may perform various functions according to a mobile convergence tendency. For example, in case of the cellular phone 910 and the smart phone 920, the cellular phone 910 and the smart phone 920 may perform a camera function although a main function of the cellular phone 910 and the smart phone 920 is a communication function. On the other hand, in case of the digital camera 930 and the camcorder 940, the digital camera 930 and the camcorder 940 may perform a communication function although a main function of the digital camera 930 and the camcorder 940 is a camera function. The mobile device 600 may include a camera image sensor 620, an application processor 640, and at least one display device 660 to perform a camera function. In addition, the mobile device 600 may further include a plurality of function circuits 680 to perform other functions. Since the mobile device 600 is described above, duplicated descriptions will be omitted below. In the mobile device 600, the application processor 640 may maintain a sensor output image to have a low resolution in a preview mode, may change a resolution of the sensor output image from a low resolution to a high resolution in response to a capture preparation signal, and may maintain the sensor output image to have a high resolution in a capture preparation mode. As a result, the mobile device 600 may prevent unnecessary power consumption in a preview mode of the camera image sensor 620, and may prevent a shutter-lag from being caused when an image is captured in a capture preparation mode of the camera image sensor 620. Further, the mobile device 600 may minimize a capture preparation mode of the camera image sensor 620 that consumes a relatively high power.

Figure 25:
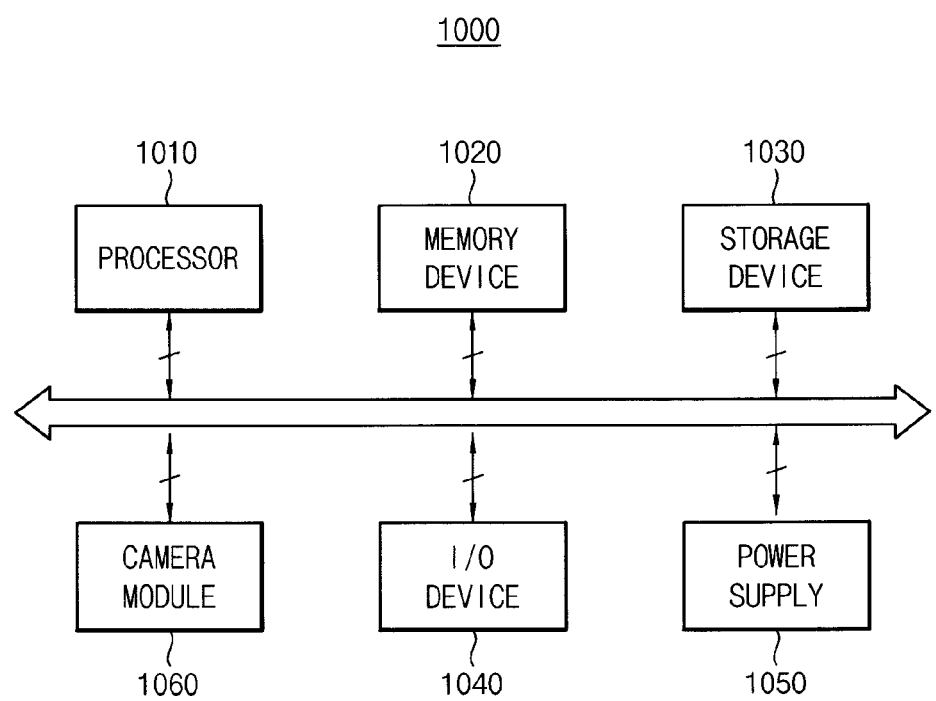
FIG. 25 is a block diagram illustrating an electric device according to example embodiments.

FIG. 25 is a block diagram illustrating an electric device according to example embodiments.

Referring to FIG. 25, the electric device 1000 may include a processor 1010, a memory device 1020, a storage device 1030, an input/output (I/O) device 1040, a power supply 1050, and a camera module 1060. Here, the camera module 1060 may correspond to the camera module 100 of FIG. 11. As not illustrated in FIG. 25, the electric device 1000 may further include a plurality of ports for communicating a video card, a sound card, a memory card, a universal serial bus (USB) device, other electric devices, etc.

The processor 1010 may perform various computing functions. The processor 1010 may be a micro-processor, a central processing unit (CPU), etc. The processor 1010 may be coupled to the memory device 1020, the storage device 1030, and the I/O device 1040 via an address bus, a control bus, a data bus, etc. In some example embodiments, the processor 1010 may be coupled to an extended bus such as a peripheral component interconnection (PCI) bus. The memory device 1020 may store data for operations of the electric device 1000. For example, the memory device 1020 may include a volatile semiconductor memory device such as a DRAM device, a SRAM device, a mobile DRAM, etc, and a non-volatile semiconductor memory device such as an EPROM device, an EEPROM device, a flash memory device, etc. The storage device 1030 may be a solid state drive device, a hard disk drive device, a CD-ROM device, etc. The I/O device 1040 may include an input device such as a keyboard, a keypad, a mouse, etc, and an output device such as a printer, a display device, etc. The power supply 1050 may provide a power for operations of the electric device 1000.

The camera module 1060 may communicate with the processor 1010 via buses or other communication links. In some example embodiments, the processor 1010 may be an application processor. Here, all components or some components of the camera module may be coupled to the application processor, or may be included in the application processor. As described above, the camera module 1060 may include an image sensor unit, an image signal processing unit, and a mode control unit. Here, the mode control unit may control the image sensor unit to output a sensor output image having a low resolution in a preview mode, and may control the image sensor unit to output the sensor output image having a high resolution in a capture preparation mode. In addition, the mode control unit may control the image signal processing unit to process and output the sensor output image having a low resolution in a preview mode, and may control the image signal processing unit to process and output the sensor output image having a high resolution in a capture preparation mode. As a result, the camera module 1060 may prevent unnecessary power consumption in a preview mode of the camera module 1060, and may prevent a shutter-lag from being caused when an image is captured in a capture preparation mode of the camera module 1060. Further, the camera module 1060 may minimize a capture preparation mode of the camera module 1060, a capture preparation mode of the camera module 1060 consuming a relatively high power. It should be understood that the electric device 1000 is interpreted as a system having the camera module 1060.

Figure 26:
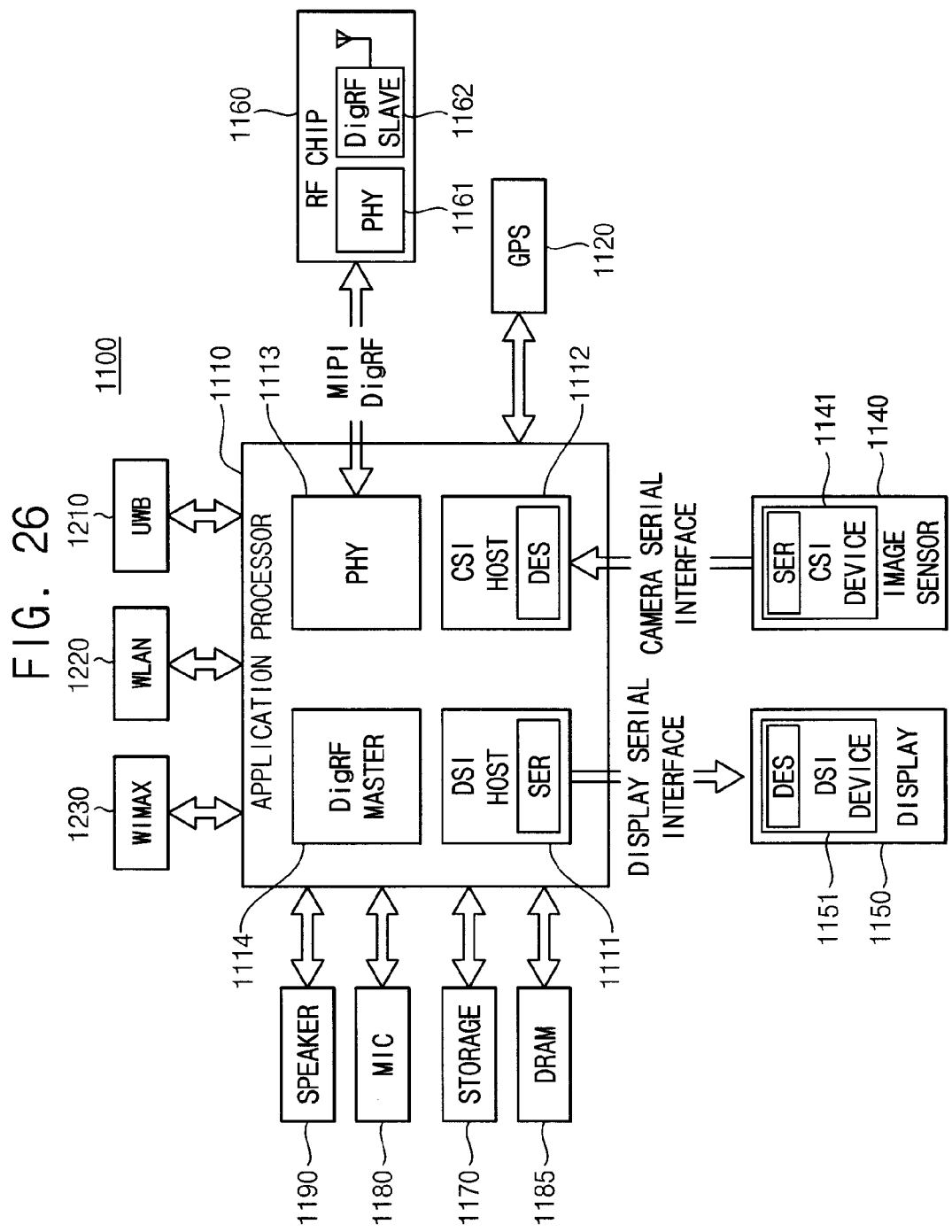
FIG. 26 is a block diagram illustrating an example of an interface used for an electric device of FIG. 25.

FIG. 26 is a block diagram illustrating an example of an interface used for an electric device of FIG. 25.

Referring to FIG. 26, the electric device 1100 may be implemented by a data processing device that uses, or supports a mobile industry processor interface (MIPI) interface. The electric device 1100 may include an application processor 1110, an image sensor 1140, a display device 1150, etc. A CSI host 1112 of the application processor 1110 may perform a serial communication with a CSI device 1141 of the image sensor 1140 using a camera serial interface (CSI). According to example embodiments of the inventive concepts, the CSI host 1112 may include a light deserializer (DES), and the CSI device 1141 may include a light serializer (SER). A DSI host 1111 of the application processor 1110 may perform a serial communication with a DSI device 1151 of the display device 1150 using a display serial interface (DSI). According to example embodiments of the inventive concepts, the DSI host 1111 may include a light serializer (SER), and the DSI device 1151 may include a light deserializer (DES).

Further, the electric device 1100 may further include a radio frequency (RF) chip 1160. The RF chip 1160 may perform a communication with the application processor 1110. A physical layer (PHY) 1113 of the electric device 1100 and a physical layer (PHY) 1161 of the RF chip 1160 may perform data communications based on a MIPI DigRF. The application processor 1110 may further include a DigRF MASTER 1114 that controls the data communications of the PHY 1161. The electric device 1100 may include a global positioning system (GPS) 1120, a storage 1170, a MIC 1180, a DRAM device 1185, and a speaker 1190. In addition, the electric device 1100 may perform communications using an ultra wideband (UWB) 1210, a wireless local area network (WLAN) 1220, a worldwide interoperability for microwave access (WIMAX) 1230, etc. However, the structure and the interface of the electric device 1100 are not limited thereto.

Example embodiments of the inventive concepts may be applied to a camera module and an electric device (e.g., a mobile device) having the camera module. For example, example embodiments of the inventive concepts may be applied to an electric device including, for example, a computer, a laptop, a digital camera, a 3D camera, a video camcorder, a cellular phone, a smart phone, a personal digital assistant (PDA), a portable multimedia player (PMP), a navigation system, a monitoring system, an auto focusing system, a video phone, a digital television, etc.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of reducing shutter-lag in a camera image sensor, the method comprising:
maintaining a sensor output image to have a low resolution in a preview mode of a camera image sensor;
changing a resolution of the sensor output image from a low resolution to a high resolution in response to a capture preparation signal to change an operation mode of the camera image sensor from the preview mode to a capture preparation mode, the low resolution being a resolution equal to or below a reference resolution, the high resolution being a resolution above the reference resolution;
receiving a capture signal, the capture signal being different from the capture preparation signal; and
capturing the sensor output image in response to the capture signal in the capture preparation mode of the camera image sensor.

2. The method of claim 1, further comprising:
changing the resolution of the sensor output image from the high resolution to the low resolution to change the operation mode of the camera image sensor from the capture preparation mode to the preview mode after the sensor output image is captured in the capture preparation mode.

3. The method of claim 2, wherein the resolution of the sensor output image is changed from the high resolution to the low resolution to change the operation mode of the camera image sensor from the capture preparation mode to a preview mode after a reference amount of time elapses in the capture preparation mode.

4. The method of claim 2, wherein the resolution of the sensor output image is changed from the high resolution to the low resolution to change the operation mode of the camera image sensor from the capture preparation mode to a preview mode after a mode change signal is input in the capture preparation mode.

5. The method of claim 1, wherein the resolution of the sensor output image is changed from the low resolution to the high resolution after the capture preparation signal is input in a preview mode of the camera image sensor.

6. The method of claim 1, wherein a resolution of the sensor output image is changed from a low resolution to a high resolution after a reference amount of time elapses after the capture preparation signal is input in the preview mode of the camera image sensor.

7. The method of claim 1, wherein the capture preparation signal is generated based on an auto-focus start signal for performing a focusing operation.

8. The method of claim 1, wherein the capture preparation signal is generated based on an external input signal for performing a focusing operation.

9. The method of claim 1, wherein the capture preparation signal is generated based on at least one signal that is selected among a touch input signal, a button input signal, and a sound input signal.

10. The method of claim 1, wherein the capture preparation signal is generated based on a smile detection signal for performing a smile detecting operation.

11. The method of claim 1, wherein the capture preparation signal is generated based on a face detection signal for performing a face detecting operation.

12. The method of claim 1, wherein a size of the sensor output image having the low resolution corresponds to an output size of a display displaying the sensor output image, and the size of the sensor output image having the low resolution is changed as the output size of the display is changed.

13. The method of claim 1', wherein a size of the sensor output image having a high resolution corresponds to a reference size, and the reference size is changed by a user.

14. A camera module comprising:
an image sensor unit configured to generate a sensor output image by performing a photoelectric transformation;
a mode control unit configured to maintain the sensor output image to have a low resolution in a preview mode of the camera module, configured to change a resolution of the sensor output image from the low resolution to a high resolution in response to a capture preparation signal, configured to maintain the sensor output image to have the high resolution in a capture preparation mode of the camera module, configured to receive a capture signal, and configured to capture the sensor output image in response to the capture signal, the low resolution being a resolution equal to or below a reference resolution, the high resolution being a resolution above the reference resolution, the capture signal being different from the capture preparation signal; and
an image signal processing unit configured to process the sensor output image to generate image data.

15. The module of claim 14, wherein the camera module is implemented by a system on chip (SOC).

16. The module of claim 14, wherein the mode control unit is configured to set the sensor output image to have the low resolution in the preview mode of the camera module, and the mode control unit is configured to set the sensor output image to have the high resolution in the capture preparation mode of the camera module.

17. The module of claim 16, wherein the mode control unit is configured such that the mode control unit changes the operation mode of the camera module from the capture preparation mode to the preview mode after the sensor output image is captured in the capture preparation mode of the camera module.

18. The module of claim 17, wherein the mode control unit is configured such that the mode control unit changes the operation mode of the camera module from the capture preparation mode to the preview mode after a reference amount of time elapses in the capture preparation mode of the camera module.

19. The module of claim 17, wherein the mode control unit is configured such that the mode control unit changes the operation mode of the camera module from the capture preparation mode to the preview mode when a mode change signal is input in the capture preparation mode of the camera module.

20. The module of claim 16, wherein the capture preparation signal is generated based on an auto-focus start signal for performing a focusing operation.

21. The module of claim 16, wherein the capture preparation signal is generated based on an external input signal for performing a focusing operation.

22. The module of claim 16, wherein the capture preparation signal is generated based on a smile detection signal for performing a smile detecting operation.

23. The module of claim 16, wherein the capture preparation signal is generated based on a face detection signal for performing a face detecting operation.

24. A mobile device comprising:
- a camera image sensor configured to generate a sensor output image;
- an application processor configured to process the sensor output image; and
- at least one display device configured to generate a display based on the sensor output image,
- wherein the application processor comprises,
  - a mode controller configured to maintain the sensor output image to have a low resolution in a preview mode of the camera image sensor, configured to change a resolution of the sensor output image from the low resolution to a high resolution in response to a capture preparation signal, configured to maintain the sensor output image to have the high resolution in a capture preparation mode of the camera image sensor, configured to receive a capture signal, and configured to capture the sensor output image in response to the capture signal, the capture signal being different from the capture preparation signal;
  - an image signal processor configured to process the sensor output image to generate first image data;
  - a post-processor configured to post-process the first image data to generate second image data; and
  - a display controller configured to provide the second image data, the display being generated based on the second image data.

25. The device of claim 24, wherein the application processor further comprises:
- a memory device configured to temporarily store the first image data and to output the first image data to the post-processor.

26. The device of claim 24, wherein the mode controller comprises a real-time operation system (RTOS).

27. The device of claim 24, wherein the mobile device is a cellular phone, a smart phone, a digital camera, a tablet, or camcorder.

28. The device of claim 27, wherein the application processor is coupled to an external display device through at least one input/output (I/O) terminal, and the application processor is configured to output the image data to the external display device.

29. The device of claim 27, wherein the application processor is configured to communicate with the camera image sensor based on MIPI, ITU-R BT.601, ITU-R BT.656, or ITU-R BT.709.

30. The device of claim 27, wherein the capture preparation signal is generated based on an auto-focus start signal for performing a focusing operation.

31. The device of claim 27, wherein the capture preparation signal is generated based on an external input signal for performing a focusing operation.

32. The device of claim 27, wherein the capture preparation signal is generated based on a smile detection signal for performing a smile detecting operation.

33. The device of claim 27, wherein the capture preparation signal is generated based on a face detection signal for performing a face detecting operation.

34. An application processor comprising:
- a camera control unit configured to control an operation of an image sensor, the image sensor being externally coupled to the application processor,
- wherein the camera control unit is configured to,
  - cause the image sensor to maintain a first resolution as an image output resolution of the image sensor in a preview mode of the image sensor,
  - change the image output resolution from the first resolution to a second resolution in response to a capture preparation signal which triggers a capture preparation mode of the image sensor,
  - receive a capture signal, and
  - capture an image output by the image sensor in response to the capture signal,
- the second resolution being higher than the first resolution,
- the capture signal being different from the capture preparation signal.

35. The application processor of claim 34, wherein the capture preparation signal is generated based on an auto-focus start signal for performing a focusing operation.

36. The application processor of claim 34, wherein the capture preparation signal is generated based on an external input signal for performing a focusing operation.

37. The application processor of claim 34, wherein the capture preparation signal is generated based on a smile detection signal for performing a smile detecting operation.

38. The application processor of claim 34, wherein the capture preparation signal is generated based on a face detection signal for performing a face detecting operation.

39. The application processor of claim 34, wherein the camera control unit is configured to change the image output resolution from the second resolution to a third resolution to change the operation mode of the image sensor from the capture preparation mode to the preview mode after the sensor output image is captured in the capture preparation mode, the second resolution being higher than the third resolution.

\* \* \* \* \*